United States Patent
Eltawil et al.

(10) Patent No.: US 10,277,382 B2
(45) Date of Patent: *Apr. 30, 2019

(54) FULL DUPLEX RECONFIGURABLE ANTENNA SELF-INTERFERENCE CANCELLATION SYSTEMS

(71) Applicant: The Regents of the University of California, Oakland, CA (US)

(72) Inventors: Ahmed Mohamed Eltawil, Oakland, CA (US); Elsayed A. Ahmed, Oakland, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 15/587,047

(22) Filed: May 4, 2017

(65) Prior Publication Data

US 2017/0237547 A1    Aug. 17, 2017

Related U.S. Application Data

(63) Continuation of application No. 14/576,295, filed on Dec. 19, 2014, now Pat. No. 9,673,960.
(Continued)

(51) Int. Cl.
*H04L 5/14* (2006.01)
*H04W 24/10* (2009.01)
(Continued)

(52) U.S. Cl.
CPC ........... *H04L 5/1461* (2013.01); *H04B 1/525* (2013.01); *H04L 5/1453* (2013.01); *H04W 24/10* (2013.01); *H04L 5/14* (2013.01); *H04W 88/06* (2013.01)

(58) Field of Classification Search
CPC .... H04L 5/1461; H04L 5/1453; H04W 24/10; H04B 1/525
See application file for complete search history.

(56) References Cited

U.S. PATENT DOCUMENTS 9,602,157 B2    3/2017  Eltawil et al.
2006/0030277 A1  2/2006  Cyr et al.
(Continued)

OTHER PUBLICATIONS

Bharadia et al., Full Duplex Radios, SIGCOMM'13, Aug. 12-16, 2013, Hong Kong, China.
(Continued)

*Primary Examiner* — Gary Mui
(74) *Attorney, Agent, or Firm* — Thomas | Horstemeyer, LLP; David R. Risley; Jason M. Perilla

(57) ABSTRACT

Embodiments of transceivers with one or more reconfigurable antennas are described. In one embodiment, a reconfigurable antenna transceiver includes a transmit chain, a receive chain, and a reconfigurable antenna having a plurality of reconfigurable modes. The transceiver may also include an antenna controller configured to set a mode of the reconfigurable antenna. According to other aspects, the transceiver may also include a signal processor configured to transmit a set of training symbols during a training interval. The antenna controller may be further configured to select a respective mode of the reconfigurable antenna for each training symbol in the set of training symbols. Additionally, the antenna controller may be configured to calculate a received Signal-of-Interest to Interferer Ratio (SIR) for each training symbol of the set of training symbols. In this context, a system utilizing a reconfigurable antenna may achieve significant rate improvement compared to half-duplex systems.

20 Claims, 17 Drawing Sheets

Related U.S. Application Data

(60) Provisional application No. 62/002,517, filed on May 23, 2014.

(51) Int. Cl.
  *H04B 1/525* (2015.01)
  *H04W 88/06* (2009.01)

(56) References Cited

U.S. PATENT DOCUMENTS

| | | |
|---|---|---|
| 2006/0262841 A1 | 11/2006 | Vaisanen et al. |
| 2008/0198074 A1 | 8/2008 | Walton et al. |
| 2008/0280571 A1 | 11/2008 | Rofougaran et al. |
| 2009/0130990 A1 | 5/2009 | Rofougaran |
| 2009/0185510 A1 | 7/2009 | Elahi et al. |
| 2009/0186582 A1 | 7/2009 | Muhammad et al. |
| 2010/0232324 A1 | 9/2010 | Radunovic et al. |
| 2013/0114468 A1 | 5/2013 | Hui et al. |
| 2013/0301484 A1 | 11/2013 | Khandani |
| 2013/0301487 A1 | 11/2013 | Khandani |
| 2013/0301488 A1 | 11/2013 | Hong et al. |
| 2013/0301747 A1 | 11/2013 | Khandani |
| 2014/0050124 A1 | 2/2014 | Yang et al. |
| 2014/0269449 A1 | 9/2014 | Abramsky et al. |
| 2014/0348018 A1 | 11/2014 | Bharadia et al. |
| 2014/0348032 A1 | 11/2014 | Hua et al. |
| 2015/0092621 A1 | 4/2015 | Jalloul et al. |
| 2015/0236750 A1 | 8/2015 | Choi et al. |
| 2015/0311985 A1 | 10/2015 | Kim et al. |
| 2017/0170948 A1 | 6/2017 | Eltawil et al. |

OTHER PUBLICATIONS

A. Balatsoukas-Stimming et al., "On Self-interference Suppression Methods for Low-complexity Full-duplex MIMO," Asilomar Conference on Signals, Systems and Computers, Nov. 2013. Available: http://infoscience.epfl.ch/record/191294.

A. Sahai et al., "On the Impact of Phase Noise on Active Cancelation in Wireless Full-Duplex," Vehicular Technology, IEEE Transactions on, vol. 62, No. 9, pp. 4494,4510, Nov. 2013.

B. Radunovic et al., "Rethinking indoor wireless Mesh Design: Low power, low frequency, full duplex," Wireless Mesh Networks (WIMESH 2010), 2010 Fifth IEEE Workshop on, pp. 1-6, Jun. 2010.

C. Anderson et al., "Antenna isolation, wideband multipath propagation measurements, and interference mitigation for on-frequency repeaters," SoutheastCon, 2004. Proceedings. IEEE, Mar. 26-29, 2004.

D. Bharadia et al., "Full Duplex Radios, " in ACM SIGCOMM, Aug. 2013.

D.W. Bliss et al., "Hardware phenomenological effects on cochannel full-duplex MIMO relay performance," Signals, Systems and Computers (ASILOMAR), 2012 Conference Record of the Forty Sixth Asilomar Conference on, pp. 34,39, Nov. 4-7, 2012.

E. Ahmed et al., "Rate Gain Region and Design Tradeoffs for Full-Duplex Wireless Communications," Wireless Communications, IEEE Transactions on , vol. 12, No. 7, pp. 3556,3565, Jul. 2013.

E. Ahmed et al., "On Phase Noise Suppression in Full-Duplex Systems," submitted to IEEE Transactions on Wireless Communications, Jan. 2014. [Online]. Available: http://arxiv.org/abs/1401.6437.

E. Ahmed et al., "Self-Interference Cancellation with Nonlinear Distortion Suppression for Full-Duplex Systems," to appear Asilomar Conference on Signals, Systems and Computers, Nov. 2013. [Online]. Available: http://arxiv.org/abs/1307.3796.

E. Ahmed et al., "Self-Interference Cancellation with Phase Noise Induced ICI Suppression for Full-Duplex Systems," to appear Global Telecommunications Conference (GLOBECOM 2013), Dec. 2013. [Online]. Available: http://arxiv.org/abs/1307.4149.

E. Ahmed et al., "Simultaneous Transmit and Sense for Cognitive Radios Using Full-duplex: A First Study," 2012 IEEE International Symposium on Antennas and Propagation and USNC-URSI National Radio Science Meeting, 2012.

E. Everett et al., "Empowering full-duplex wireless communication by exploiting directional diversity," Signals, Systems, and Computers (ASILOMAR), 2011 Conference Record of the Forty Fifth Asilomar Conference on, pp. 2002-2006, Nov. 2011.

E. Everett et al., "Passive Self-Interference Suppression for Full-Duplex Infrastructure Nodes," Wireless Communications, IEEE Transactions on, vol. 13, No. 2, pp. 680,694, Feb. 2014.

H. Arslan et al., "Error vector magnitude to SNR conversion for nondata-aided receivers," IEEE Transactions on Wireless Communications, vol. 8, No. 5, pp. 2694-2704, May 2009.

J. I. Choi et al., "Achieving single channel, full duplex wireless communication," in MobiCom, 2010.

K. Haneda et al., "Measurement of loop-back interference channels for outdoor-to-indoor full-duplex radio relays," Antennas and Propagation (EuCAP), 2010 Proceedings of the Fourth European Conference on, pp. 12-16, Apr. 2010.

M. Duarte et al., "Design and Characterization of a Full-Duplex Multiantenna System for WiFi Networks," Vehicular Technology, IEEE Transactions on, vol. 63, No. 3, pp. 1160,1177, Mar. 2014.

M. Duarte et al., "Experiment-Driven Characterization of Full-Duplex Wireless Systems," Wireles Communications, IEEE Transactions on, vol. 1, No. 12, pp. 4296,4307, Dec. 2012.

M. Duarte et al., "Full-duplex wireless communications using off-the-shelf radios: Feasibility and first results," Signals, Systems, and Computers (ASILOMAR), 2010 Conference Record of the Forty Fourth Asilomar Conference, pp. 1558-1562, Nov. 2010.

M. Jain et al., "Practical, Real-time, Full Duplex Wireless," Proceeding of the ACM Mobicom, Sep. 2011.

M.E. Knox, "Single antenna full duplex communications using a common carrier," Wireless and Microwave Technology Conference (WAMICON), 2012 IEEE 13th Annual, pp. 15-17, Apr. 2012.

R. F. Harrington, "Reactively controlled directive arrays," submitted to IEEE Trans. Antennas Propag., vol. 26, No. 3, pp. 390-395, May 1978.

V. Syrjala et al., "Analysis of Oscillator Phase-Noise Effects on Self-Interference Cancellation in Full-Duplex OFDM Radio Transceivers," submitted to IEEE Transactions on Wireless Communications, Jan. 2014. [Online]. Available: http://arxiv.org/abs/1401.3521.

W. Slingsby et al., "Antenna isolation measurements for on-frequency radio repeaters," antennas and Propagation, 1995., Ninth International Conference on (Conf. Publ. No. 407), pp. 4-7, Apr. 1995.

Z. Li et al., "A new class of antenna array with a reconfigurable element factors," IEEE Trans. Antennas Propag., vol. 61, No. 4, pp. 1947-1955, Apr. 2013.

FULL DUPLEX RECONFIGURABLE ANTENNA SELF-INTERFERENCE CANCELLATION SYSTEMS

CROSS-REFERENCE TO RELATED APPLICATIONS

This application is a continuation of U.S. Non-Provisional patent application Ser. No. 14/576,295, filed Dec. 19, 2014, and claims the benefit of U.S. Provisional Application No. 62/002,517, filed May 23, 2014, the entire contents of both of which are hereby incorporated herein by reference.

This invention was made with government support under grant ECCS-0955157 awarded by the National Science Foundation. The government has certain rights in the invention.

BACKGROUND

Many wireless systems operate in a half-duplex communications mode, where wireless devices are either transmitting or receiving, but not using the same temporal and spectral resources. Full-duplex communications modes may double the efficiency of bidirectional communications over the same temporal and spectral resources. In full-duplex mode, a wireless device can transmit radio frequency (RF) signals at a carrier frequency using a transmit antenna while simultaneously receiving RF signals over the same carrier frequency through a collocated receive antenna. A wireless device can also transmit RF signals at a carrier frequency using an antenna while simultaneously receiving RF signals over the same carrier frequency through the same antenna using a circulator or similar device. One limitation impacting full-duplex communications within a transceiver, however, is managing any self-interference signals imposed on the receive antenna by the transmit antenna.

BRIEF DESCRIPTION OF THE DRAWINGS

For a more complete understanding of the embodiments described herein and the advantages thereof, reference is now made to the following description, in conjunction with the accompanying figures briefly described as follows.

Figure 1:
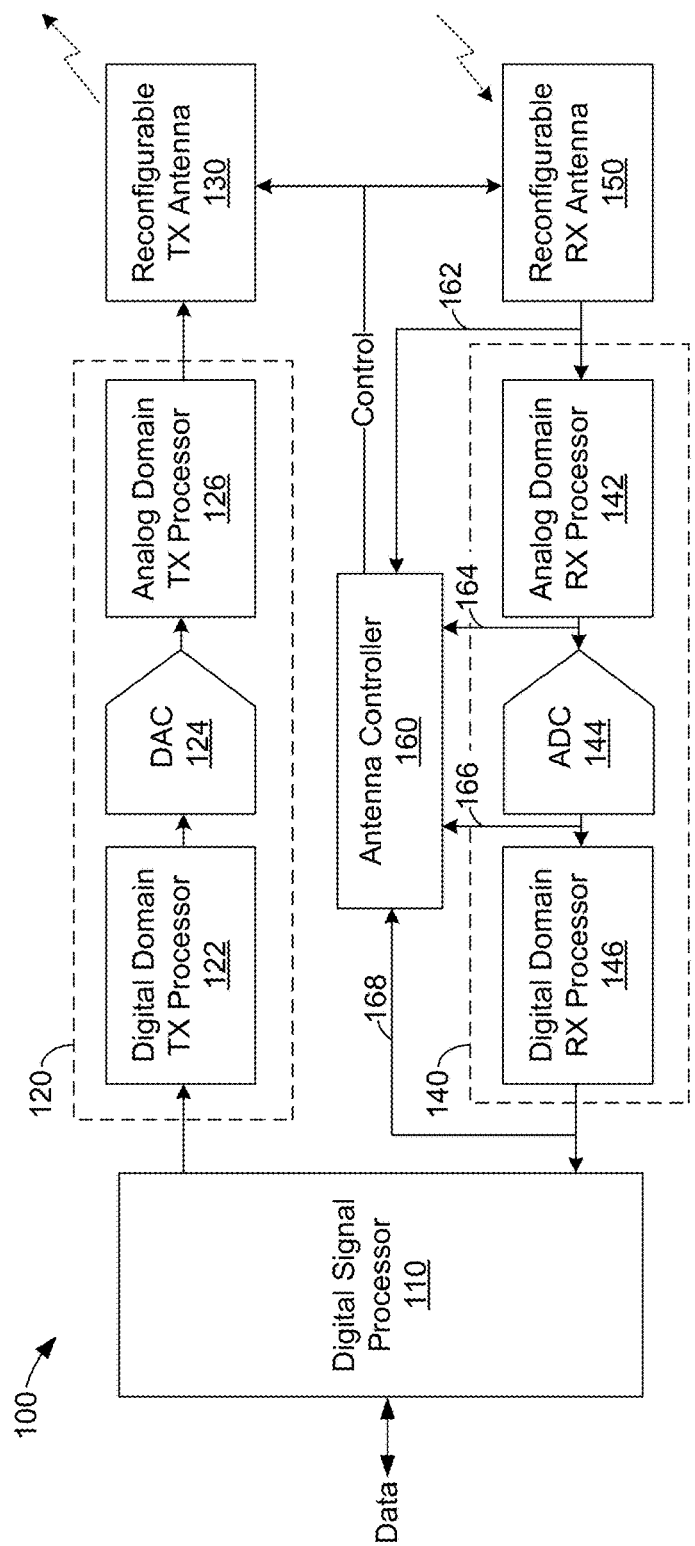
FIG. 1 illustrates a two antenna full-duplex reconfigurable antenna transceiver according to one example embodiment described herein.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

Due to increases in wireless data traffic, one challenge for future wireless systems is the utilization of the available spectrum to achieve better data rates. Recently, full-duplex communications, where bidirectional communications are carried out over the same temporal and spectral resources, have been introduced as a mechanism to potentially double the spectral efficiency of wireless systems. One limitation impacting full-duplex communications within a transceiver is managing any self-interference signals imposed on the receive antenna by the transmit antenna. Full-duplex systems may achieve substantial rate improvement over half-duplex systems when self-interference signals are mitigated.

Self-interference cancellation techniques may be generally divided into passive suppression and active cancellation categories. In passive suppression, a self-interference signal is suppressed in the propagation domain before it is processed by receiver circuitry. In active cancellation techniques, a self-interference signal is mitigated by subtracting a processed copy of a transmitted signal from a received signal. Experimental and analytical results show that the mitigation capability of active cancellation techniques is relatively limited, mainly due to transmitter and receiver radio circuit impairments. On the other hand, as compared to active cancellation techniques, passive suppression techniques mitigate both the self-interference signal and the transmitter noise associated with it. In addition, mitigating the self-interference signal before it is processed by the receiver circuitry decreases the effect of receiver noise and increases the dynamic range allocated for the desired signal, thus achieving better performance.

Passive self-interference suppression may be achieved through one or a combination of the following methods: (i) antenna separation, (ii) antenna isolation, (iii) antenna directionality, and (iv) antenna polarization. The applicability of each of these techniques depends on both the application and the physical constraints of the system. For example, in mobile applications with small device dimensions, the level of passive suppression achieved using antenna separation and isolation is relatively limited. In other systems where transmit and receive antennas are not necessarily collocated (e.g., relay systems), antenna separation and isolation may achieve relatively significant passive suppression. In contrast to situations where relatively large antenna separation is possible, the embodiments described herein focus on the deployment of full-duplex communications where antenna separation is relatively limited.

It is noted that the directional antennas used in passive suppression systems are generally single pattern directional antennas. The lack of beam steering capability in such antennas may affect signal-of-interest power in certain scenarios (e.g., when the desired signal is coming from the opposite direction of the antenna). On the other hand, the antenna re-configurability described herein may be relied upon to maximize a performance metric, such as the received Signal-of-Interest to Interferer Ratio (SIR) metric, which represents a metric of good performance as described in further detail below.

In the context provided above, various full-duplex reconfigurable antenna systems are described herein. In one embodiment, a full-duplex reconfigurable antenna transceiver includes a transmit chain, a receive chain, and a reconfigurable antenna having a plurality of reconfigurable modes. The transceiver may also include an antenna controller configured to set a mode of the reconfigurable antenna. According to other aspects, the transceiver may also include a signal processor configured to transmit a set of training symbols during a training mode. The antenna controller may be further configured to select a respective mode of the reconfigurable antenna for each training symbol in the set of training symbols. Additionally, the antenna controller may be configured to calculate a performance metric, such as a received Signal-of-Interest to Interferer Ratio (SIR) for each training symbol of the set of training symbols, for example. In this context, a full-duplex system utilizing a reconfigurable antenna may achieve a significant rate of improvement compared to half-duplex systems.

According to other aspects described herein, by appropriately controlling (e.g., reconfiguring) antenna properties of a reconfigurable antenna, a high degree of passive suppression can be achieved to facilitate full-duplex communications. As used herein, a reconfigurable antenna is any antenna or antenna system having reconfigurable properties which may be dynamically changed according to certain input configurations. Among others, some example reconfigurable antenna properties include: (i) antenna radiation pattern, (ii) antenna polarization, and (iii) antenna operating frequency. A reconfigurable antenna system may be embodied as a single antenna element or an array of antenna elements.

In one example embodiment described herein, a full-duplex system utilizing a multi-reconfigurable antenna (MRA) with about 90% rate improvement compared to half-duplex systems is described. According to various aspects, an MRA may be embodied as a dynamic multi-reconfigurable antenna or antenna array structure that is capable of changing its properties according to certain input configurations. An experimental analysis, as described below, was conducted to characterize system performance using the MRA in typical indoor environments. The analysis was performed using a fabricated MRA having 4,096 configurable radiation patterns. Examples of the MRA-based passive self-interference suppression are detailed below along with an analysis of MRA training overhead. In addition, a heuristic-based approach is proposed to reduce MRA training overhead. The results show that, at 1% training overhead, a total of about 95 dB self-interference cancellation is achieved in typical indoor environments. The 95 dB self-interference cancellation is experimentally shown to be sufficient for a 90% full-duplex rate improvement compared to half-duplex systems. Further, the passive self-interference suppression techniques described herein may be used alone or combined with other active self-interference cancellation techniques to achieve better performance.

According to other aspects of the embodiments, an MRA pattern selection mechanism is described. The pattern selection mechanism is tailored to select an optimum pattern among various available MRA patterns. Because an MRA may have many radiation patterns, for example, one can select a suitable pattern that minimizes received self-interference power. To seek the best overall system performance, a pattern selection mechanism that maximizes the received SIR at the receiver input may be relied upon. Using an MRA as a receive antenna in a full-duplex communications system, the performance of MRA-based passive self-interference suppression is experimentally investigated, as described in further detail below. The results presented below show that MRA-based passive self-interference suppression can achieve an average of about 65 dB of passive self-interference suppression, with about a 45 dB SIR gain compared to when an omni-directional antenna is used.

Additionally, since an MRA may be trained in order to select an optimal antenna mode, training time and overhead parameters are investigated. In this context, a heuristic-based approach is proposed to reduce the training overhead by selecting a small suboptimal set of patterns among the full set of MRA antenna modes. The results show that, using the proposed heuristic-based approach at 1% training overhead with a suboptimal set of 300 patterns, about 62 dBs of passive suppression may be achieved with only about a 3 dB performance loss as compared to the optimal case.

In another embodiment, a method of reconfiguring an antenna of a transceiver is described. The method of reconfiguring includes transmitting, with a transmit chain of the transceiver, a set of training symbols, selecting, with an antenna controller, a respective mode of a reconfigurable antenna of the transceiver for each training symbol in the set of training symbols, and calculating, with an antenna controller, a received performance metric for each of the set of training symbols. The method may further include selecting a mode of the reconfigurable antenna for use during a data transmission interval based on the performance metric of each of the set of training symbols. In other aspects, selecting the mode of the reconfigurable antenna may be further based upon a threshold performance criteria of the transceiver, as described in further detail below.

Finally, a complete full-duplex system with a combined MRA-based passive suppression and conventional active self-interference cancellation is presented. The overall system performance is evaluated in different indoor environmental conditions. The results show that, at 1% training overhead, a total of about 95 dB self-interference cancellation is achieved in typical indoor environments. The 95 dB self-interference cancellation is experimentally shown to be sufficient for 90% full-duplex rate improvement compared to half-duplex systems at about 5 dBm transmit power.

Turning to the figures, various aspects of the embodiments are described in further detail.

FIG. 1 illustrates a two antenna full-duplex reconfigurable antenna transceiver 100 according to one example embodiment described herein. In operation, the transceiver 100 may transmit and receive data, at least in part, in an overlapping time period and/or overlapping frequency channel or range. The transceiver 100 in FIG. 1 includes digital signal processor 110, transmit chain 120, reconfigurable transmit (TX) antenna 130, receive chain 140, reconfigurable receive (RX) antenna 150, and antenna controller 160. As also illustrated in FIG. 1, the transmit chain 120 includes a digital domain TX processor 122, a digital-to-analog converter (DAC) 124, and an analog domain TX processor 126. The receive chain 140 includes an analog domain RX processor 142, an analog-to-digital converter (ADC) 144, and a digital domain RX processor 146.

The operation of the transceiver 100 may be configured, at least in part, by the antenna controller 160. As illustrated in FIG. 1, the antenna controller 160 provides one or more control signals to one or both of the reconfigurable TX antenna 130 and/or the reconfigurable RX antenna 150 ("the antennas 130 and 150"). In this way, the antenna controller 160 may administer or control the electrical structures, characteristics, and/or properties of the antennas 130 and 150 over time. In other words, according to aspects of the embodiments, the antenna controller 160 is configured to determine and define certain operating parameters of the antennas 130 and 150 over time to optimize various performance metrics, as described herein. As input, the antenna controller 160 may receive any one, two, three, or all four of the signals 162, 164, 166, and 168, respectively, the output of the reconfigurable RX antenna 150, the output of the analog domain RX processor 142, the output of the ADC 144, and the output of the digital domain RX processor 146, as illustrated in FIG. 1.

The digital signal processor 110 may be embodied as any suitable processor for digital signals and is configured to modulate transmit symbols to transmit data and demodulate receive symbols to receive data. Generally, the digital signal processor 110 may be configured to modulate and demodulate data for wireless communications using any suitable digital modulation technique, such as amplitude shift keying (ASK), frequency shift keying (FSK), minimum shift keying (MSK), phase shift keying (PSK), quadrature amplitude modulation (QAM), etc., with or without the use of error coding and correction (e.g., cyclic coding, block coding, adaptive coding etc.), multiplexing (e.g., orthogonal frequency-division multiplexing, etc.), and/or spread spectrum techniques. In this context, the digital signal processor 110 may be embodied as a general- or specific-purpose processor optimized though hardware, software, or a combination of hardware and software for digital signal processing. The digital signal processor 110 may include memory to store and execute programs (e.g., signal processing algorithms, signal filtering algorithms, etc.) and memory to store data (e.g., constellation space, symbol, bit, etc. data). Additional details regarding the structure and function of the digital signal processor 110 are described in further detail below with reference to FIG. 20.

The digital domain TX processor 122 may be embodied as any suitable signal processor for baseband data processing. In this sense, the digital domain TX processor 122 may include one or more baseband digital filters, interpolators, decimators, scalers, etc. In this context, among other functions, the digital domain TX processor 122 may be configured to filter, rate-adapt, and/or scale digital signals received from the digital signal processor 110 and, thus, prepare them for digital-to-analog conversion and transmission over the antenna 130. The DAC 124 may be embodied as any suitable digital-to-analog converter configured to convert a digital signal to an analog signal. The analog domain TX processor 124 may be embodied as any suitable physical layer front-end circuitry for wireless data transmission. In this sense, the analog domain TX processor 124 may include one or more filters, frequency-upconverters, amplifiers, etc. In this context, among other functions, the analog domain TX processor 124 is configured to amplify, frequency-upconvert, and transmit digitally-modulated data signals over the antenna 130.

The analog domain RX processor 142 may be embodied as any suitable physical layer front-end circuitry for wireless data reception. In this sense, the analog domain RX processor 142 may include one or more filters, amplifiers, etc. In this context, among other functions, the analog domain RX processor 142 is configured to amplify digitally-modulated data signals received over the antenna 150. The ADC 144 may be embodied as any suitable analog-to-digital converter configured to convert an analog signal to a digital signal. The digital domain RX processor 146 may be embodied as any suitable signal processor for front-end data reception. In this sense, the digital domain RX processor 146 may include one or more digital filters, interpolators, decimators, scalers, etc. In this context, among other functions, the digital domain RX processor 146 may be configured to filter, rate-adapt, and/or scale digital signals received from the ADC 144 and, thus, prepare them for further processing by the digital signal processor 110.

Figure 2:
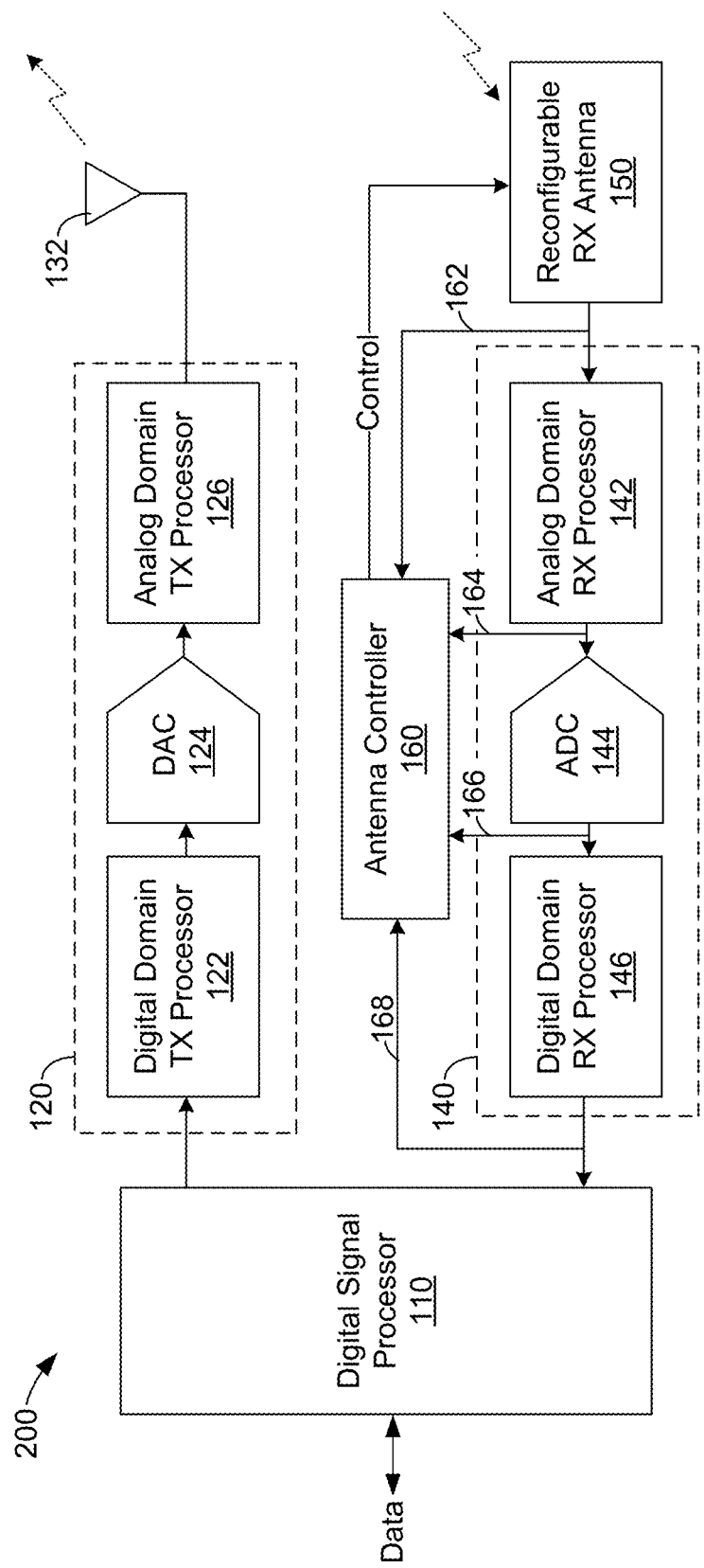
FIG. 2 illustrates a two antenna full-duplex reconfigurable receive antenna transceiver according to another example embodiment described herein.

It should be appreciated that the transceiver 100 in FIG. 1 is provided by way of example only. That is, the passive self-interference suppression techniques described herein may be used in connection with other receiver, transmitter, and transceiver systems and architectures. As one example, FIG. 2 illustrates a two antenna full-duplex reconfigurable receive antenna transceiver 200 according to another example embodiment described herein. As compared to the transceiver 100 in FIG. 1, the transceiver 200 in FIG. 2 includes a non-reconfigurable TX antenna 132 in place of the reconfigurable transmit TX antenna 130. In the transceiver 200, the antenna controller 160 provides one or more control signals to the reconfigurable RX antenna 150. In this way, the antenna controller 160 may administer or control the electrical structure, characteristics, or properties of the antenna 150 over time.

Figure 3:
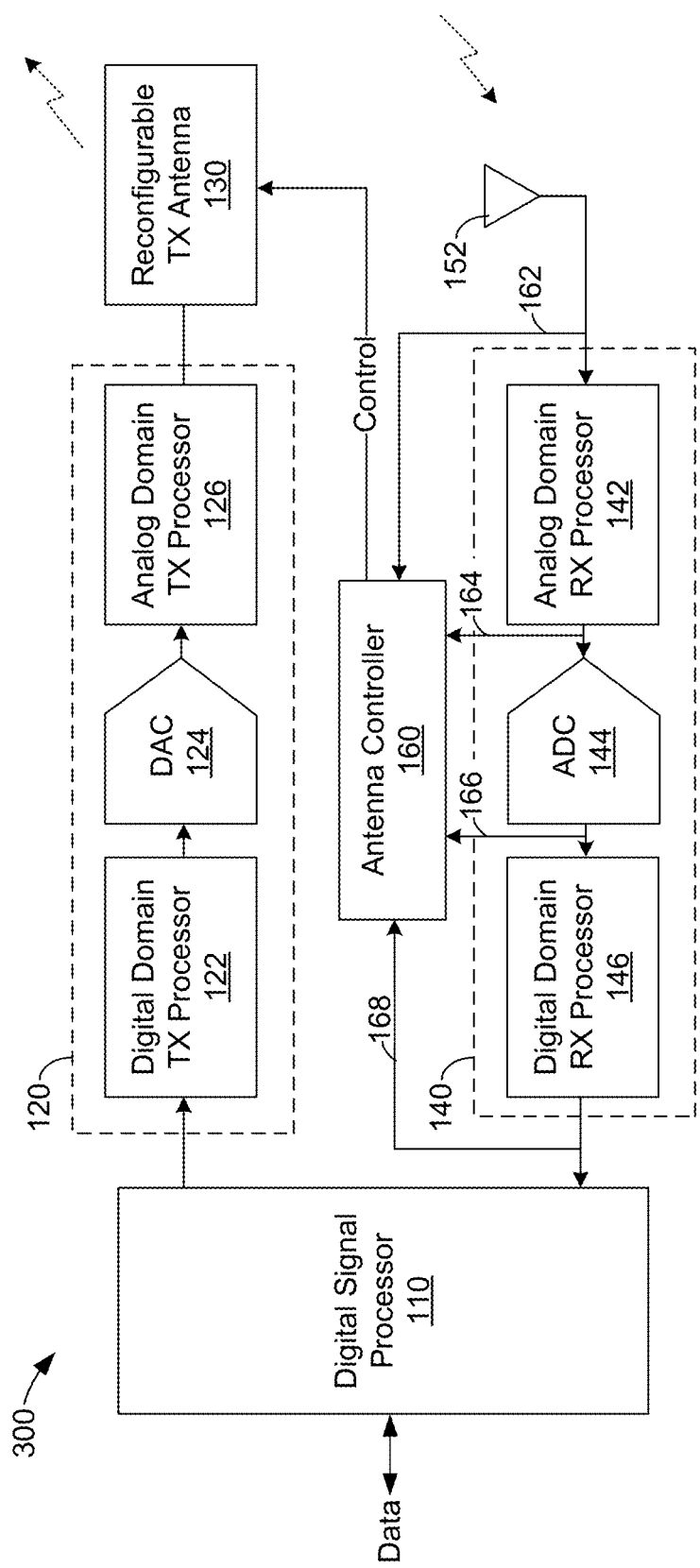
FIG. 3 illustrates a two antenna full-duplex reconfigurable transmit antenna transceiver according to another one example embodiment described herein.

As another example, FIG. 3 illustrates a two antenna full-duplex reconfigurable transmit antenna transceiver 300 according to another example embodiment described herein. As compared to the transceiver 100 in FIG. 1, the transceiver 300 in FIG. 3 includes a non-reconfigurable RX antenna 152 in place of the reconfigurable transmit RX antenna 150. In the transceiver 300, the antenna controller 160 provides one or more control signals to the reconfigurable TX antenna 130. In this way, the antenna controller 160 may administer or control the electrical structure, characteristics, or properties of the antenna 130 over time.

Figure 4:
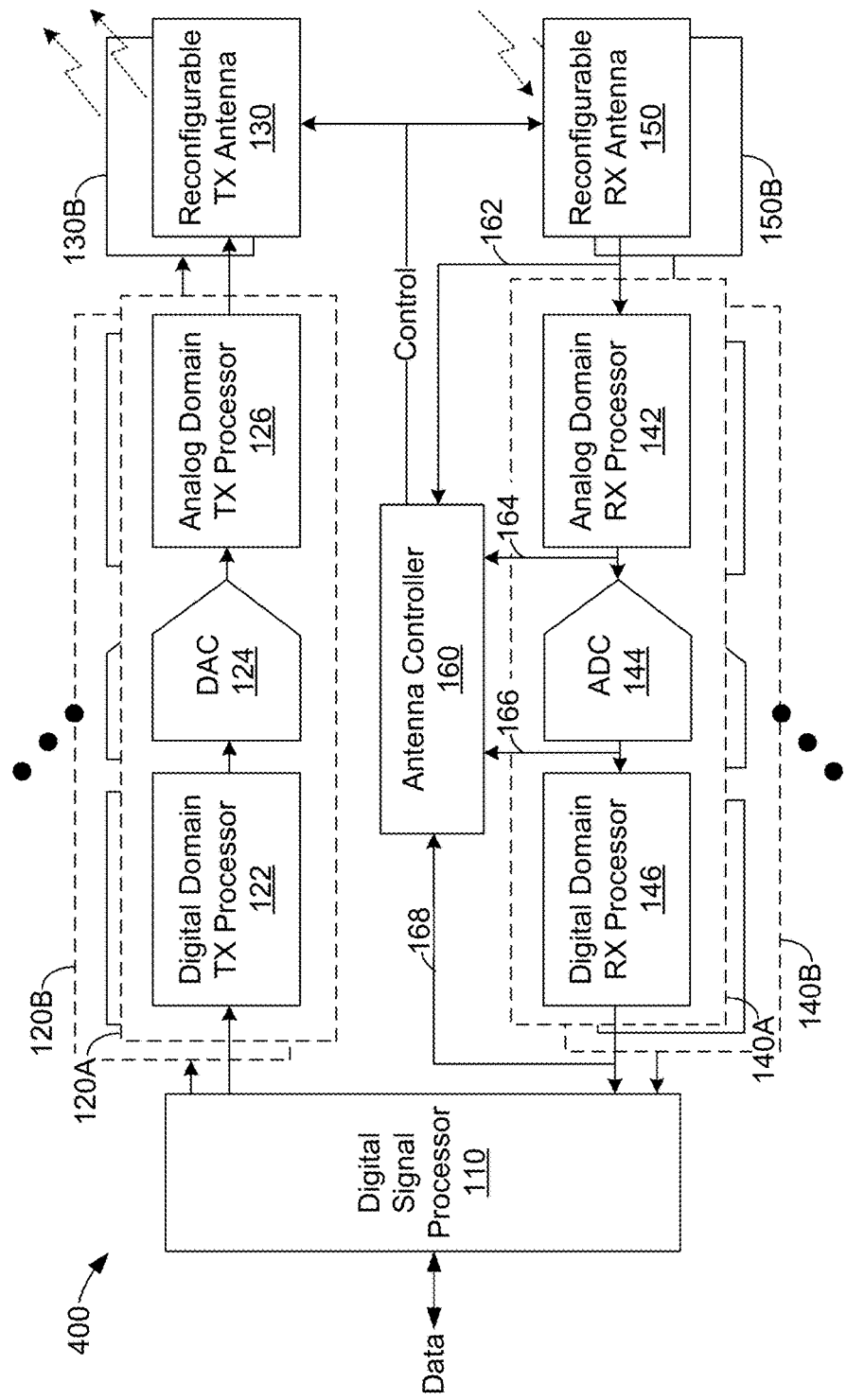
FIG. 4 illustrates a block diagram of a multi-antenna, multi-chain full-duplex reconfigurable antenna transceiver according to another example embodiment described herein.

In other embodiments, any of the architectures illustrated in FIGS. 1-3 may be extended to multi-antenna, multi-chain full-duplex systems with M transmit and N receive chains, for example, connected to one or more reconfigurable antennas, as illustrated in FIG. 4. FIG. 4 illustrates a multi-antenna, multi-chain full-duplex reconfigurable antenna transceiver 400. As compared to the transceiver 100 in FIG. 1, the transceiver 400 in FIG. 4 includes two or more transmit chains (e.g., 120A, 120B, . . . ) similar to the transmit chain 120 in FIG. 1 and two or more receive chains (e.g., 140A, 140B, . . . ) similar to the receive chain 140 in FIG. 1.

Generally, the reconfigurable antenna transceivers 100, 200, 300, 400, etc. described herein have different modes of operation. Each mode of operation is defined in part by certain electrical structures, characteristics, and/or properties (e.g., operating frequency, polarization, and radiation pattern, etc.) of one or both of the antennas 130 and 150. Referring among FIGS. 1-4, the antenna controller 160 is configured to select and control the antenna mode of one or both of the antennas 130 and 150. Based on the selected antenna mode and environmental conditions (e.g., frequency-selective fading, multipath interference, etc.), which may vary over time, each mode achieves certain performance criteria that vary from others. In this context, the antenna controller 160 is configured to select an antenna mode that satisfies certain threshold performance requirements or criteria, for example.

For further context, assume a full-duplex system with a reconfigurable receive antenna and an omnidirectional transmit antenna. In this system, the self-interference signal and signal-of-interest may arrive at the receive antenna from different directions of arrival depending upon the environmental conditions. Because the reconfigurable antennas described herein are capable of changing their radiation pattern, for example, one way to reduce the received self-interference power is to select a radiation pattern having a relatively lower antenna gain in the direction of the self-interference signal. Thus, the antenna controller 160 may be configured to select a radiation pattern having a relatively lower antenna gain in the direction of the self-interference signal, based on any one, two, three, or all four of the signals 162, 164, 166, and 168 in FIGS. 1-4. Generally, the antenna controller 160 may be configured to select an antenna mode that optimizes certain performance metrics.

Since one goal of the transceivers described herein is to minimize any received self-interference signal, the antenna controller 160 may monitor received self-interference power, for example, as one metric for improvement in performance. In this case, the antenna controller 160 may select an antenna mode that minimizes received self-interference power. However, because the antenna mode affects both the received self-interference and signal-of-interest simultaneously, minimizing the received self-interference power is not the only performance metric or factor in achieving optimal performance. For instance, certain antenna modes may suppress the self-interference signal but also significantly reduce the received signal-of-interest power. Thus, in full-duplex systems, it should be appreciated that a more suitable performance metric may be measured by way of received Signal-of-Interest to Interferer Ratio (SIR). SIR is defined as the ratio between the received signal-of-interest power and the received self-interference power. Thus, the antenna controller 160 may select an antenna mode that maximizes the received SIR. According to one embodiment described herein, the antenna controller calculates the SIR for each of L available antenna modes, and then selects an antenna mode that maximizes the received SIR.

To assist the antenna controller 160 with the selection of an antenna mode, a transmission frame may be divided into two main intervals: (i) a training interval and (ii) a data transmission interval. During the training interval, the transceiver 100 (or one of the transceivers 200, 300, or 400) transmits a training frame including a number of training symbols equal to the number of antenna modes of one or a combination of the antennas 130 and 150. The training frame is processed by the transmit chain 120 and transmitted by the antenna 130. Overlapping in time with the transmission of the training frame, the transceiver 100 receives the training frame, as a self-interference signal, over the antenna 150, and the receive chain 140 processes it.

While the training frame is being transmitted and received from the antenna 130, the antenna controller 160 varies the mode of the antenna 130, the antenna 150, or both the antennas 130 and 150 with each training symbol. In this way, each transmitted training symbol corresponds to a respective transmit and/or receive antenna mode. It should be appreciated that, for the transceiver 100 in FIG. 1, the combined number of antenna modes may be determined as the number of transmit modes of the antenna 130 multiplied by the number of receive modes of the antenna 150. On the other hand, for the transceiver 200 in FIG. 2, the number of antenna modes is reduced to the number of receive modes of the antenna 150 because the antenna 132 is not an MRA antenna and has only one transmit mode. Also, for the transceiver 300 in FIG. 3, the number of antenna modes is reduced to the number of transmit modes of the antenna 130 because the antenna 152 is not an MRA antenna and has only one receive mode.

Figure 5:
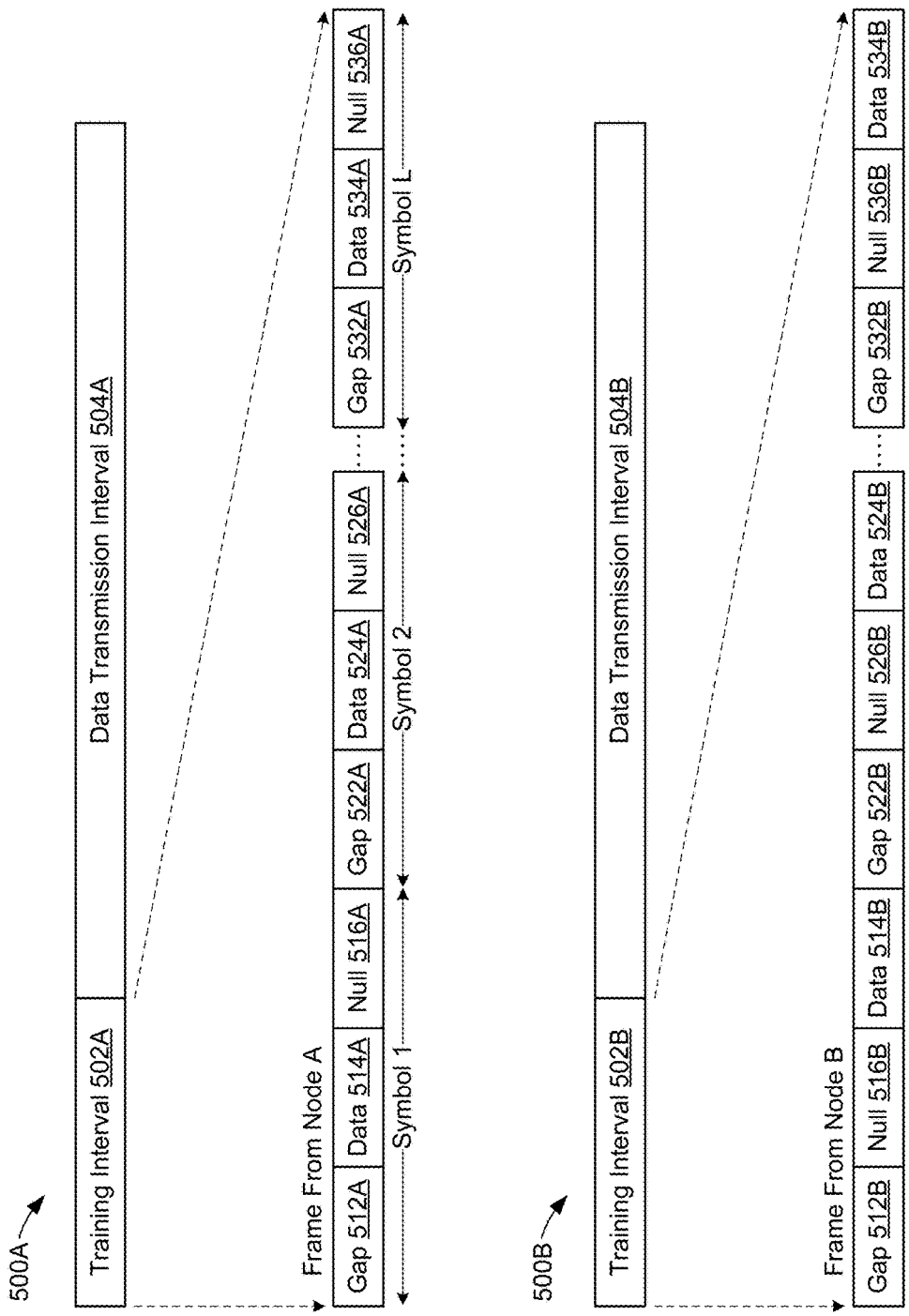
FIG. 5 illustrates an example structure of a frame for maximizing the Signal-of-Interest to Interferer Ratio (SIR) according to the embodiments described herein.

FIG. 5 illustrates an example structure of a frame 500A for maximizing the SIR according to the embodiments described herein. The frame 500A in FIG. 5 is provided by way of example only, as other frame structures may be used to calculate SIR and are within the scope of the embodiments. In FIG. 5, the frame 500A includes a training interval 502A and a data transmission interval 504A. During the training interval 502A, the transceiver 100 transmits L training symbols (Symbol 1-Symbol L.) via the antenna 130, where L is the number of antenna modes. That is, in one embodiment, the transceiver 100 transmits L training symbols for each mode of the antennas 130 and 150.

Each training symbol in the training interval 502A includes a gap interval 512 (512A, 522A, 532A, etc.), a data interval 514 (514A, 524A, 534A, etc.), and a null interval 516 (516A, 526A, 536A, etc.). The gap interval 512 may be used to account for antenna switching time. During the data interval 514, the transceiver 100 transmits a training sequence. During the null interval 516, the transceiver 100 is silent (i.e., refrains from any transmission).

The position of the data 514 and null intervals 516 within each training symbol may be assigned such that, at any point in time, only one full-duplex transceiver (e.g., 100, 200, 300, 400, etc.) is transmitting data and all other transceivers are silent. For example, where a system comprises of two full-duplex nodes or transceivers (nodes A and B) in communication with each other, the data 514 and null intervals 516 may be alternated between the two nodes. In this context, frame 500B of a second (node B) transceiver includes a training interval 502B having a gap interval (512B, 522B, 532B, etc.), a null interval (516B, 526B, 536B, etc.), and a data interval (514B, 524B, 534B, etc.). Comparing the frames 500A and 500B in FIG. 5, the positions of the data 514 and null intervals 516 are alternated in time so that only one of the node A or node B transceivers are transmitting at a time.

The training symbols 1-L of the transmission interval 502A are received by the transceiver 100 via the antenna 150. Further, in the case of two full-duplex nodes or transceivers, combined training symbols 1-L of the transmission intervals 502A and 502B are received by the transceiver 100 via the antenna 150. Each received training symbol contains a self-interference portion and a signal-of-interest portion. Using the self-interference and signal-of-interest portions, the antenna controller 160 processes each received training symbol and calculates a received SIR for one or more of the antenna modes of the antennas 130 and 150. The SIR for the antenna modes may be calculated using one or more of the signals 162, 164, 166, and 168, for example, as references.

At the end of the training interval 502A, antenna controller 160 is configured to select an antenna mode that maximizes the SIR for use during the data transmission interval 504. After the training interval 502A, the data transmission interval 504A begins. During the data transmission interval 504A, normal full-duplex communications occur. The use of one training symbol 1-L for each antenna mode involves a relatively exhaustive search approach. According to other embodiments described below, certain techniques may be relied upon to reduce the search space. For example, the set of possible antenna modes may be divided into multiple groups to achieve coarse and fine mode searching methodologies. In this context, the antennal controller 160 may be configured to categorize search spaces to accelerate the selection of a suitable antenna mode.

Figure 6A:
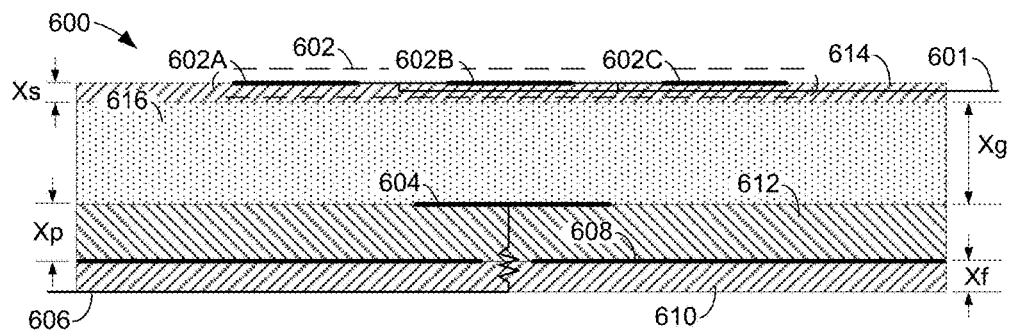
FIG. 6A illustrates a cross-sectional side profile view of an example multi-reconfigurable antenna (MRA) according to one embodiment described herein.

FIG. 6A illustrates a cross-sectional side profile view of an example MRA 600 according to one embodiment described herein. Either of the antennas 130 and/or 150 in FIG. 1 may be embodied as the MRA 600. As described in further detail below, the MRA 600 may be configured to dynamically change its proprieties (e.g., radiation pattern, polarization, operating frequency, etc.) according to control signals provided by the antenna controller 160 (FIG. 1), for example. At the outset, it is noted that the MRA 600 in FIG. 6 is provided by way of example, is not drawn to scale, and is not intended to be limiting of the scope of the embodiments. In other words, while the MRA 600 illustrated in FIGS. 6A (and 6B) is described below as having a certain structure, the embodiments described herein may rely upon reconfigurable antennas which vary in size, shape, materials, modes of operation, etc., as compared to the MRA 600.

Figure 6B:
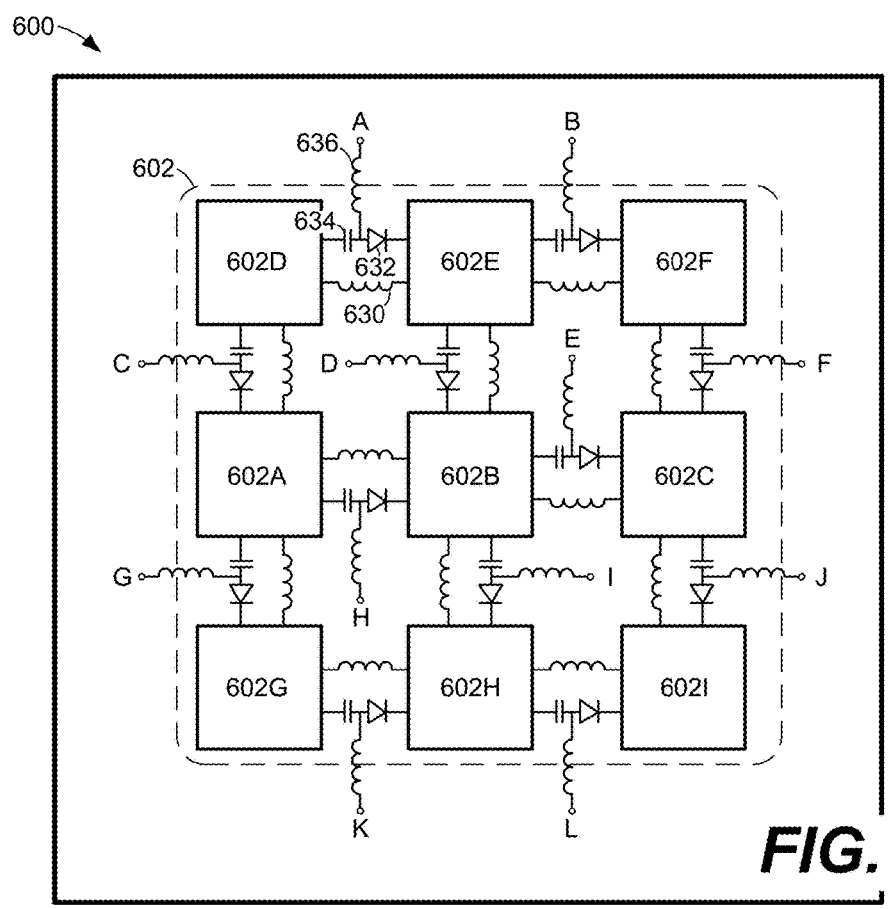
FIG. 6B illustrates a top-down view of the example MRA in FIG. 6A according to one embodiment described herein.
Figure 7:
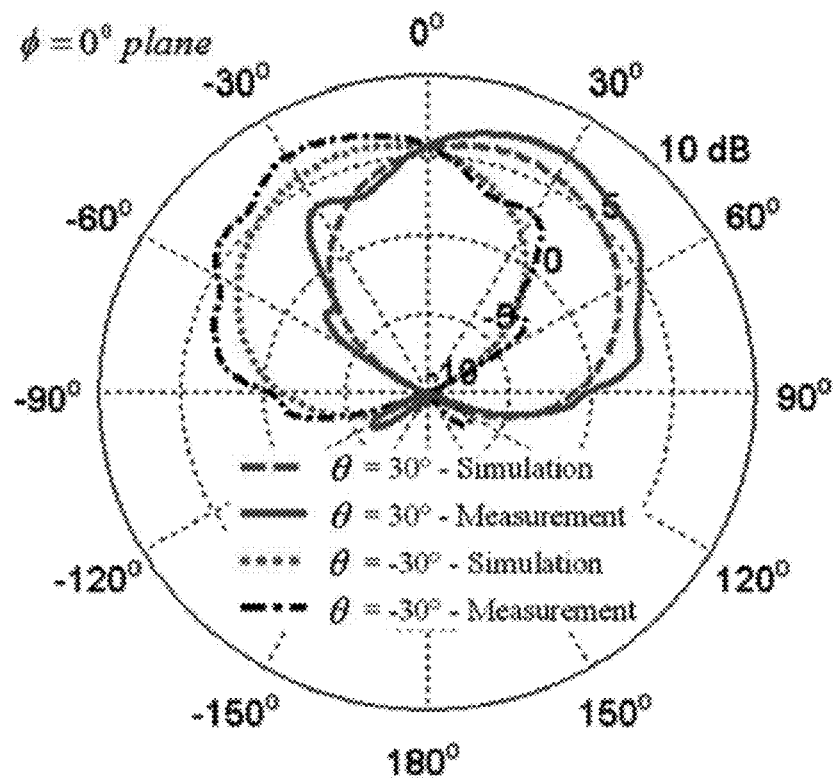
FIG. 7 illustrates simulated and measured reconfigurable antenna radiation patterns for four different modes of operation of the MRA 600 in FIGS. 6A and 6B, showing agreement between simulated and measured patterns.
Figure 7:
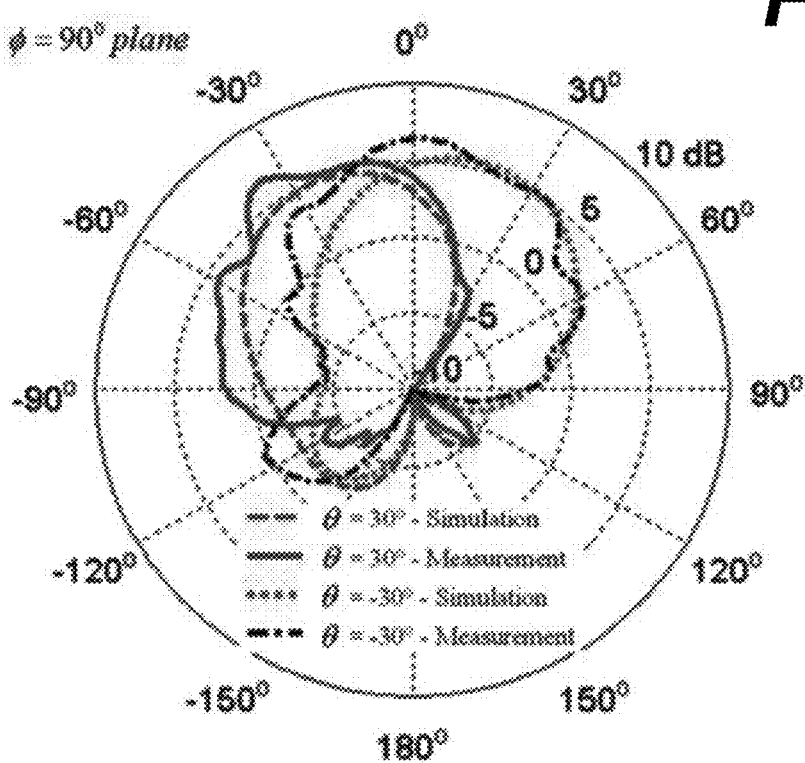

The working mechanism of the MRA 600, which is embodied as a driven antenna and multiple parasitic pixel elements, can be described by the theory of reactively controlled directive arrays. The direction of the main beam of the MRA 600 may be directed by proper reactive loading of parasitic pixel elements of the MRA 600. In the MRA 600, proper reactive loading corresponds to a specific geometry of the parasitic pixel elements, which is obtained by switching PIN diode switches between certain pairs of adjacent pixels ON or OFF. Switching the PIN diode switches ON or OFF, as described in further detail below, provides 4,096 different modes of operation for the MRA 600, each with a unique radiation pattern. As part of an empirical analysis of the MRA 600, FIG. 7 illustrates simulated and measured reconfigurable antenna radiation patterns for four different modes of operation of the MRA 600 in FIGS. 6A and 6B, showing agreement between simulated and measured patterns.

The MRA 600 employs an aperture-coupled feed mechanism for radio frequency (RF) feeding. The MRA 600 includes a driven patch antenna 602 and a driven patch 604. From the top-down view (i.e., as in FIG. 6B), the driven patch 604 may be relatively square in shape and have length and width dimensions of about 19.3×19.3 mm$^2$, for example, although any suitable dimensions are within the scope of the embodiments. In other embodiments, the driven patch 604 may be formed in other sizes and shapes, such as circular, polygon, irregular, microstrip, etc. Also, the driven patch 604 may vary in thickness among embodiments for the desired operating characteristics.

The driven patch antenna 602 comprises a patch array of electrically configurable pixels, as further described below. Individual pixels (602A, 602B, 602C, etc.) of the driven patch antenna 602 may be electrically configured (i.e., coupled) in combination with each other to dynamically vary the properties of the MRA 600. As described in further detail below with reference to FIG. 6B, the driven patch antenna 602 may include 4, 9, 16, or any other number of individual pixels, any number of which may be electrically configured in combination with each other to dynamically vary the properties of the MRA 600. In this context, one or more pixel control lines 601, which are electrically coupled to the driven patch antenna 602 via plated through-holes, for example, may be relied upon to electrically configure the individual pixels of the driven patch antenna 602 (i.e., see control nodes A-L in FIG. 6B). From the top-down view (i.e., as in FIG. 6B), each of the individual pixels 602A, 602B, 602C, etc. of the patch antenna 602 may be relatively square in shape and have length and width dimensions of about 15×15 mm$^2$, for example, although any suitable dimensions are within the scope of the embodiments. In other embodiments, the individual pixels 602A, 602B, 602C, etc. may be formed in other sizes and shapes, such as circular, polygon, irregular, microstrip, etc. Also, the individual pixels 602A, 602B, 602C, etc. may vary in thickness among embodiments for the desired operating characteristics.

In one embodiment, the driven patch 604 is designed to operate in the frequency band of 2.4-2.5 GHz and is fed by a 50 Ω microstrip line 606 through an aperture (21.4×1.4 mm$^2$) etched through the center of a common ground plane 608. As illustrated in FIG. 6, a feed layer 610, a patch layer 612, and a pixel surface layer 614 are interposed among the driven patch antenna 602, the driven patch 604, and the microstrip line 606. In one embodiment, the feed layer 610, the patch layer 610, and the pixel surface layer 612 are formed using the ROGERS CORPORATION 4003C® substrate laminate (εr=3.55, tan δ=0.0027), although other suitable types of substrates may be relied upon among embodiments. Further, in the MRA 600, a gap 616 is formed between the patch layer 610 and the pixel surface layer 612, and the gap 616 is also formed using the RO4003C® laminate. The driven patch antenna 602, driven patch 604, and common ground plane 608 may each be formed from metal, such as copper, at any suitable thickness for the desired operating characteristics.

The feed layer 610 is 0.508 mm thick (Xf=0.508 mm), the patch layer 612 is 3.048 mm thick (Xp=3.048 mm), the pixel surface layer 614 is 1.524 mm thick (Xs=1.524 mm), and the gap 616 is 7.62 mm thick (Xg=7.62 mm), although any suitable thicknesses of the layers 610, 612, and 614 and the gap 616 are within the scope of the embodiments. The layers 610, 612, and 614 and the gap 616 may be approximately 90×90 mm² in width and length, as further described below with reference to FIG. 6B.

FIG. 6B illustrates a top-down view of the example MRA 600 in FIG. 6A according to one embodiment described herein. The MRA 600 may be formed to approximately 90×90 mm² in width and length, although other sizes are within the scope of the embodiments. As illustrated, the driven patch antenna 602 of the MRA 600 includes individual pixels 602A-I, each sized to approximately 15×15 mm², arranged in a 9-pixel 3×3 array. As noted above, in other embodiments, the MRA 600 may be formed using fewer or greater pixels in other grid arrangements.

Electrically-actuated electrical couplings are provided between certain pairs of individual pixels 602A-I of the driven patch antenna 602. As illustrated in FIG. 6A, electrically-actuated electrical couplings are provided between pixels 602D and 602E, 602E and 602F, 602A and 602B, 602B and 602C, 602G and 602H, 602H and 602I, 602D and 602A, 602A and 602G, 602E and 602B, 602B and 602H, 602F and 602C, and 602C and 602I. In other embodiments, electrically-actuated couplings may be included between other pairs of the individual pixels 602A-I, such as between the pixels 602D and 602B or 602D and 602I, for example.

As illustrated in FIG. 6B, each electrically-actuated electrical coupling includes a direct current (DC) grounding inductor, a PIN diode, a DC block capacitor, and an RF choke inductor. For each electrically-actuated electrical coupling, one of the control nodes A-L, fed by one of the pixel control lines 601 (FIG. 6A), is relied upon to bias the PIN diode to an ON/OFF state. More particularly, as provided in FIG. 6B between the pixels 602D and 602E, for example, the DC grounding inductor 630 is coupled between the pixels 602D and 602E, a series combination of the PIN diode 632 and the DC block capacitor 634 is coupled between the pixels 602D and 602E, and the RF choke inductor 636 is electrically coupled between the control node A and the electrical connection between the series combination of the PIN diode 632 and the DC block capacitor 634.

Thus, certain pairs of the individual pixels 602A-I are electrically coupled (e.g., connected or disconnected) together by switching the PIN diode switches in the electrically-actuated electrical couplings ON or OFF using control voltages applied to the control nodes A-L by way of the pixel control lines 601. In this context, the antenna controller 160 (FIG. 1) may provide control signals over the pixel control lines 601 to set the operating mode of the MRA 600. This control by the antenna controller 160 may be relied upon to change the geometry of the parasitic surface of the MRA 600, which, in turn, changes the current distribution and RF characteristic of the MRA 600.

In one embodiment, the self-resonant frequency (SRF) of the RF choke inductors (e.g., ref. 636) may be chosen at about 2.5 GHz, making them high impedance in the industrial, scientific, and medical (ISM) band, to minimize the current and effect on the bias lines to antenna performance. The DC grounding inductors (e.g., ref. 630) provide grounds for DC biasing purposes. The SRF of these DC grounding inductors may be chosen at about the same as the RF choke inductors to maintain high RF impedance between pixels. The DC block capacitors (e.g., ref. 634) may be relied upon to properly bias the PIN diode switches (e.g., ref. 632) as shown in FIG. 6B. The SRF of DC block capacitors may be chosen at about 2.5 GHz to provide low RF impedance in the ISM band. In this way, the effect of DC block capacitors on RF performance is minimized.

Turning to an experimental analysis of an example transceiver (e.g., the transceiver 200 in FIG. 2) using the MRA 600 in FIGS. 6A and 6B, the performance of the example transceiver was characterized in a typical indoor environment using the MRA 600 with 4,096 dynamically configurable radiation patterns. Due to the dependence of full-duplex system performance on the surrounding environment, such an experimental analysis is important for performance characterization.

Figure 8:
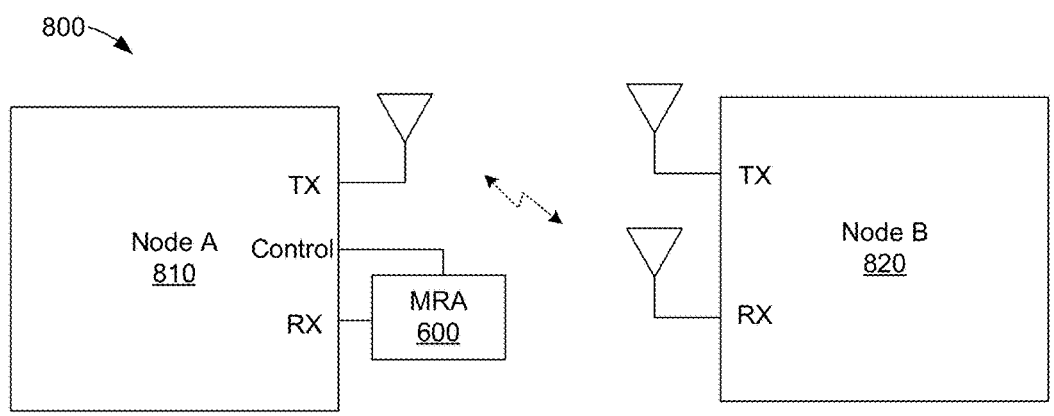
FIG. 8 illustrates a representative example full-duplex communications system consisting of two nodes according to the embodiments described herein.

FIG. 8 illustrates a representative example full-duplex communications system 800 according to the embodiments described herein. The system 800 includes transceiver node A 810 and transceiver node B 820. As transmit antennas, the transceiver nodes 810 and 820 rely upon dipole antennas. As receive antennas, the transceiver node A 810 relies upon the MRA 600 in FIGS. 6A and 6B, and the transceiver node B 820 relies upon a dipole antenna. For both the transceiver nodes 810 and 820, the Universal Software Radio Peripheral (USRP) software defined radio (SDR) platform was relied upon. Each USRP contains a Radio Frequency (RF) transceiver and a Field Programmable Gate Array (FPGA). The USRPs were connected to a host computer through a Gigabit Ethernet connection. Baseband signal processing was performed on the host computer. The baseband signals were streamed to and from the USRPs at a rate of 25M sample/sec. All experiments were performed in the ISM band at 2.5 Ghz carrier frequency with a 10 Mhz signal bandwidth. All USRPs were synchronized to one reference clock. The antenna mode for the MRA 600 was achieved through a 12-line digital control cable. The timing of all USRPs and the FPGA that drives the MRA antenna switches were aligned with a one reference pulse per second (PPS) signal. For comparison purposes, another full-duplex system having only omni-directional transmit and receive antennas was also used.

Two different frameworks, including a passive suppression characterization framework and a complete system framework, were used for characterization of the performance of the system 800. In the passive suppression characterization framework, the system 800 was used to characterize the achieved passive self-interference suppression for each MRA radiation pattern of the MRA 600 at different environmental conditions. For measurement purposes, in this framework, received SIR is used as a performance metric. The frame structure used for characterization of the passive suppression is described above with reference to FIG. 5.

In the frame structure, each transmission frame consists of L training symbols, where L is the number of antenna patterns or modes of the MRA 600 to be characterized. Each training symbol contains three intervals including a gap interval, a data interval, and a null interval. The MRA radiation pattern of the MRA 600 was changed at the edge of each training symbol, and the gap interval was used to account for MRA radiation pattern switching time. At the receiver side of the transceiver node A 810, the transmitted training symbols are combined and received by the MRA 600. In the combined training symbols, each segment contains a self-interference portion and a signal-of-interest portion. The received signal strength is calculated for each portion to obtain an estimate for the received self-interference and signal-of-interest power.

In the complete system framework, overall system performance is characterized when MRA-based passive self-interference suppression is combined with conventional digital cancellation techniques. In this framework, two different performance metrics are used, including overall self-interference cancellation and the achievable full duplex rate. The transmission frame structure in the complete system framework consists of the MRA training interval 502A and the data transmission interval 504A (FIG. 5). During the MRA training interval 502A, MRA patterns are trained and an optimum pattern is selected. During the data transmission interval 504A, full-duplex data transmission takes place between the two nodes 810 and 820. The data transmission interval 504A consists of several data frames that have a frame structure the same as or similar to that in IEEE 802.11n systems. Each data frame consists of several Orthogonal Frequency Division Multiplexing (OFDM) symbols with 64 subcarriers in each symbol. At the beginning of each data frame, training symbols are transmitted for channel estimation purposes. After channel estimation, digital self-interference cancellation is performed to mitigate the residual self-interference signal.

Since the optimum pattern selection process involves training, training time and training overhead design parameters are investigated. According to the structure of the training interval 502A, the training time and overhead are a function of the number of MRA patterns that have to be trained and the length of each training symbol in the training interval 502A. The length or duration of each training symbol is a function of the lengths of the gap 512 and data intervals 514 (FIG. 5). The length of the gap interval 512 is directly proportional to the MRA switching time, which is function of the MRA switching circuitry of the MRA 600. In the current embodiment, MRA switching time is about 0.5 us. The length of the data interval 514 depends on how the received signal strength is calculated. For example, if the received signal strength is calculated in the digital domain, the ADC sampling rate and allowable timing offset will determine the minimum data interval length. Based on experiments, approximately 30 time-domain samples are enough to obtain a good estimate for received signal strength. Therefore, using a 40 MHz ADC sampling rate, the required minimum segment duration is 2 us (0.5 us for antenna switching, and 1.5 us for data and null intervals per segment). This time could be reduced to 1.25 us if the ADC sampling rate is doubled to 80 Mhz, which is a practical sampling rate in current wireless systems.

Figure 9:
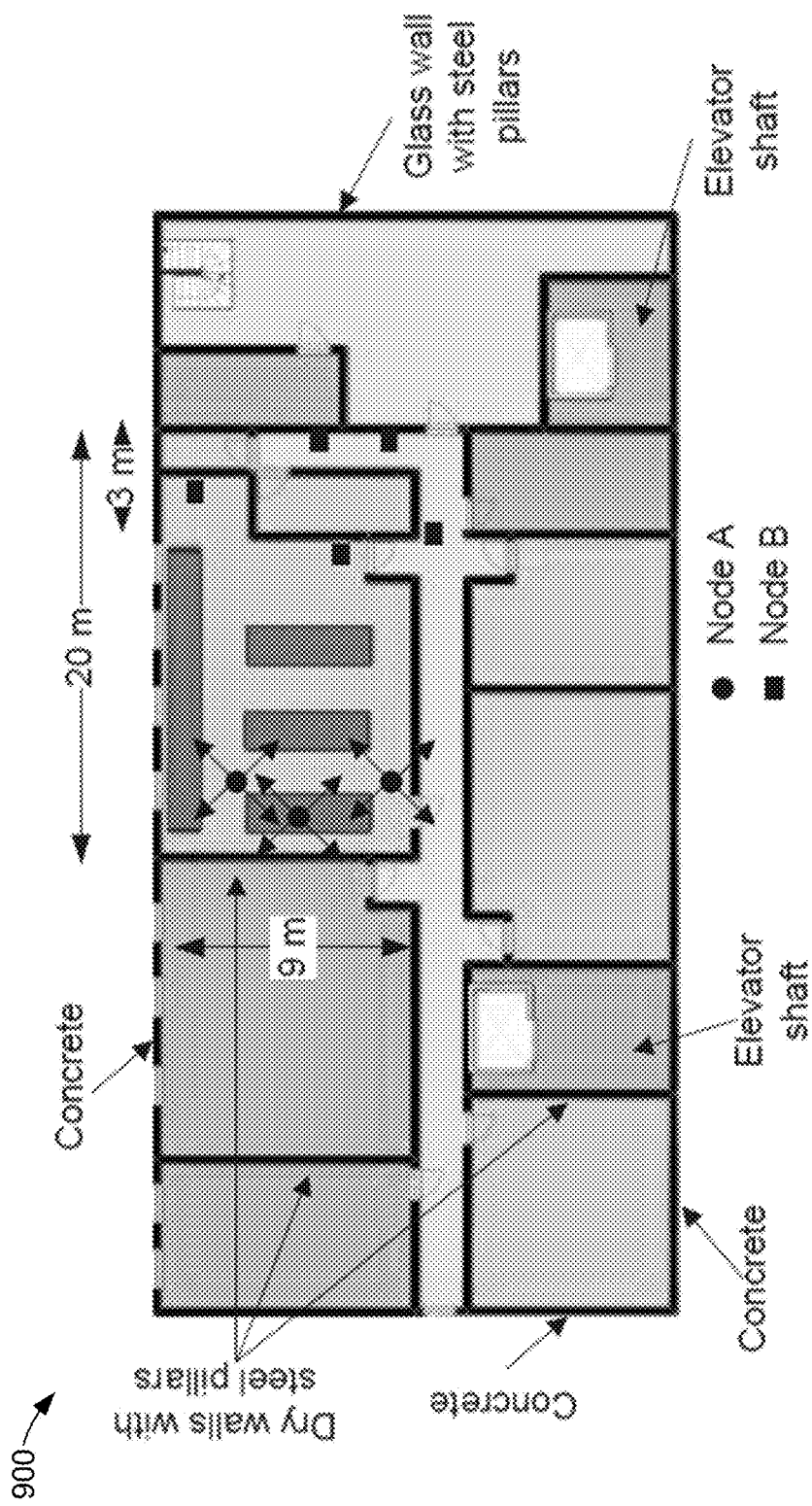
FIG. 9 illustrates an example floor plan for experiments.

FIG. 9 illustrates an example floor plan 900 for experiments. The floor plan 900 presents a typical laboratory environment with measurement workstations, tables, metallic surfaces, etc. The outer walls of the building are made of concrete or glass with steel pillars, while the inner walls are made of drywall with steel pillars. To enrich the experimental analysis, the two communicating nodes are placed at different positions inside and outside the laboratory to create a variety of Line Of Sight (LOS) and non-LOS environments. In addition, various MRA orientations were tested so that the two communicating nodes were facing each other, opposite to each other, or side to side. To emulate typical conditions, the experiments were performed in both semi-static and dynamic environments. In a semi-static environment, the area was static with no moving personnel in the near area. In dynamic environments, normal laboratory activities were maintained with moving personnel during the experiment time.

Below, the performance of the full-duplex communications system 800 ("the MRA system 800"), which relies upon MRA-based passive suppression, is described in further detail with reference to various charts. The performance is compared to a conventional omni-directional antenna based passive suppression system ("the conventional omni-directional system"). Additionally, a heuristic-based approach to reduce the overall MRA training time is described. The performance of the heuristic-based approach is compared to the optimal case where all MRA patterns are trained. Finally, the MRA training overhead and training periodicity are described. The passive suppression framework is used to characterize the achieved MRA-based passive self-interference suppression, and performance is evaluated at different transmit power values ranging from about −10 dBm to 10 dBm. Each run lasts for several seconds. In each run, all 4,096 MRA patterns of the MRA 600 (FIG. 6) are trained, and the pattern that maximizes the SIR is selected.

Figure 10:
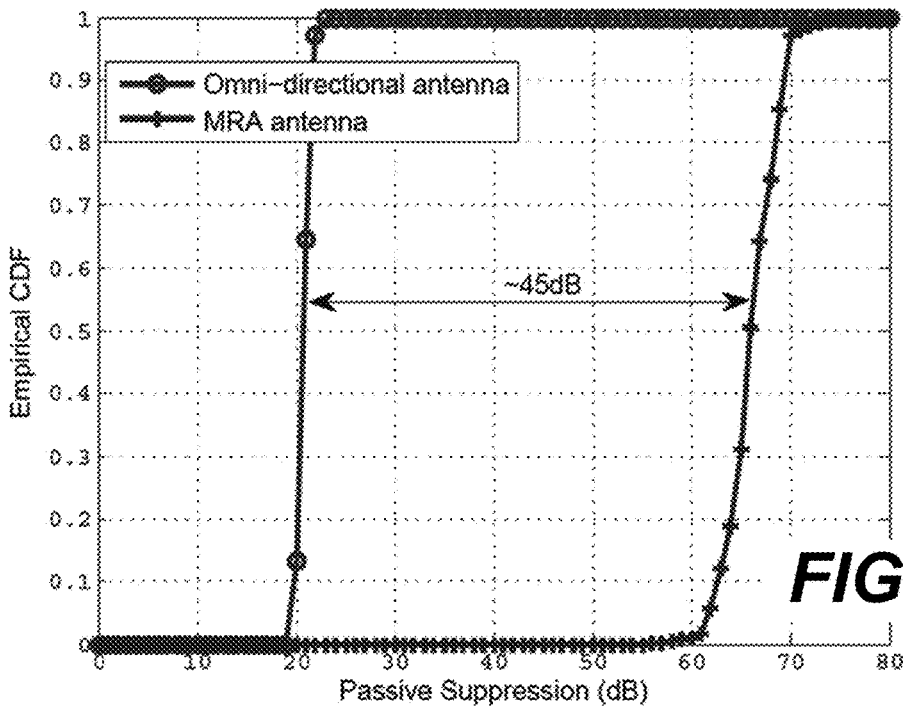
FIG. 10 illustrates a Cumulative Distribution Function (CDF) of passive self-interference suppression for the MRA system in FIG. 8 as compared to a omni-directional antenna system.

FIG. 10 illustrates a Cumulative Distribution Function (CDF) of the passive self-interference suppression for the MRA system 800 in FIG. 8 as compared to an omni-directional antenna system. The passive suppression is defined as the ratio between the transmit power and the received self-interference power at the antenna output. The CDF is calculated over time for all different runs and transmit power values. The results show that the MRA system 800 achieves an average of about 65 dB passive suppression, with about 45 dB passive suppression gain compared to the omni-directional antenna system.

Since the selected MRA pattern affects the received signal-of-interest power, the achieved passive suppression amount is not sufficient to characterize the overall system performance. Instead, the effect of the MRA on the received signal-of-interest power should be also considered. The received signal-of-interest power is affected by both the MRA pattern and the distance between the two communicating nodes. Thus, to eliminate the distance factor and focus only on the MRA effect, the signal-of-interest power loss is used as a performance metric instead of the absolute value of the received signal-of-interest power. The signal-of-interest power loss is defined as the received signal-of-interest power ratio between the MRA case and the omni-directional antenna case for the same experimental environment.

Figure 11:
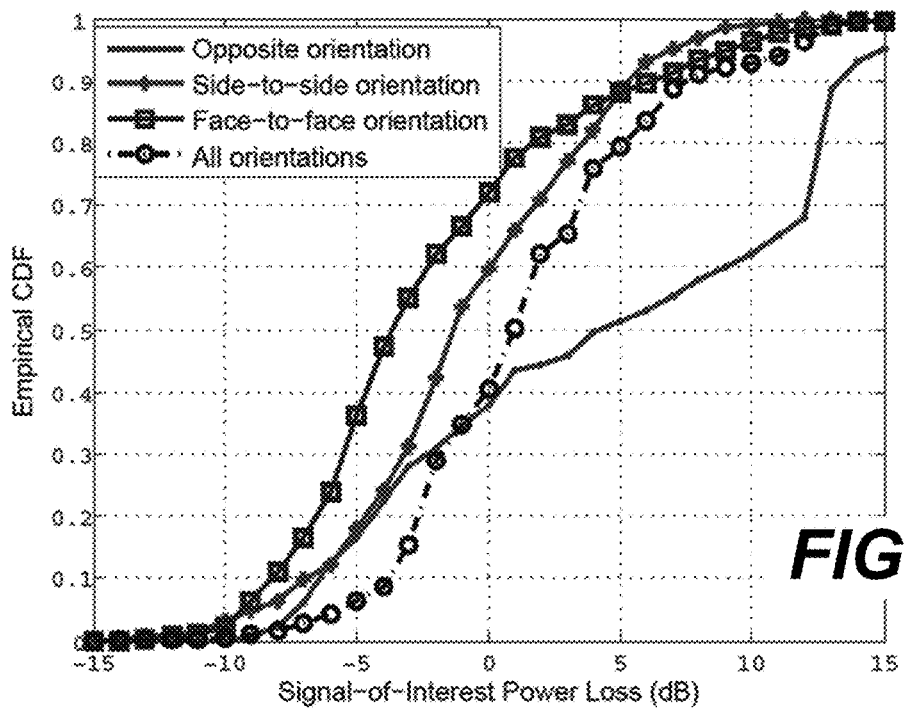
FIG. 11 illustrates a CDF of the signal-of-interest power loss for three different experimental environments in addition to the average CDF for all environments.

FIG. 11 illustrates a CDF of the signal-of-interest power loss for three different experimental environments in addition to the average CDF for all environments. In the opposite orientation environment, the back side of the MRA at one node is facing the other node. The face-to-face orientation is contrary to the opposite orientation. In the side-to-side orientation, the side of the MRA at one node is facing the other node. The main difference between the opposite orientation and the face-to-face orientation is that, in the opposite orientation, the MRA is receiving most of the signal-of-interest power through its back loops which generally have small antenna gain. However, in the face-to-face orientation, most of the power is received through the main loops of the MRA which generally have high gain due to antenna directivity. Thus, it is expected to have signal-of-interest power loss in the opposite orientations, while in the face-to-face orientation, the MRA is supposed to achieve signal-of-interest power gain. As shown in FIG. 11, an average of about 5 dB loss in the signal-of-interest power is expected in the opposite orientation environments, with an average signal-of-interest power gain of about 4 dB in face-to-face orientations and about 1 dB in side-to-side orientations, respectively. Over all orientations, an average signal-of-interest power loss of about 1 dB is expected when the MRA is used.

Figure 12:
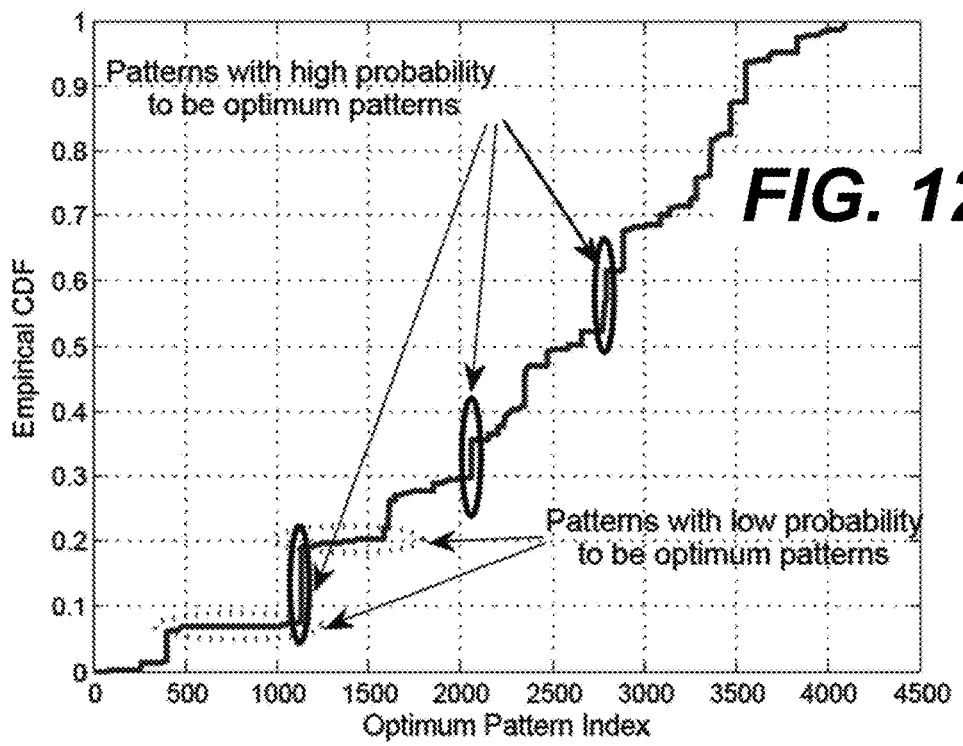
FIG. 12 illustrates a CDF of optimum pattern indexes according to the embodiments described herein.

While using an MRA antenna may lead to significant gains in passive suppression, the investment in training time required to the optimal mode(s) of the MRA may be relatively large. In this context, according to aspects of the embodiments, a heuristic-based approach is relied upon to reduce the training time overhead. To address this issue, the distribution of the optimal MRA pattern over time and for different environmental conditions was calculated. FIG. 12 illustrates a CDF of optimum pattern indexes according to the embodiments described herein. The calculated distribution may be used to check if the optimal pattern index is localized or spans the whole range from 1 to 4,096. The results in FIG. 12 show that the optimum pattern index spans the whole range, but it is not uniformly distributed. The results show that there are some patterns that have low or even zero probability to be among the optimum patterns, while other patterns have high probability to be among the optimum ones.

While one viable choice may be to exclude patterns with low probability of being optimal, it is important to take into account the degree of sub-optimality. For a pattern to have a low (or zero) probability of being optimum does not necessary mean that the pattern achieves poor performance. For instance, among those low probability patterns there are two categories: i) patterns that achieve good performance that are slightly less than the performance of the optimal pattern, and ii) patterns with poor performance that are significantly less than that of the optimal pattern. Although they have significant differences in performance, the probability criterion does not differentiate between the two categories, because they are both considered non-optimal. Accordingly, a better selection criterion should involve the self-interference suppression performance for each pattern and not only the probability of being among the optimum patterns.

For further clarification, consider that in full-duplex systems, the self-interference signal arrives at the receive antenna in two main components: the line of sight (LOS) component through the direct link between the transmit and receive antennas and the non-LOS component due to the reflections. Due to the close proximity of the transmit and receive antennas, the LOS component is much higher than the non-LOS component. Therefore, any MRA pattern with high gain in the LOS direction will most likely achieve poor performance. As such, this pattern may be avoided. The optimal patterns are the patterns that are capable of suppressing not only the LOS component but also part of the non-LOS component.

Accordingly, based on the achieved self-interference suppression for each MRA pattern, a heuristic-based approach was developed to select a suboptimal set of patterns that are expected to achieve the best performance. First, a system was run in 16 different environments that includes a variety of LOS, non-LOS, semi-static, and dynamic scenarios, each with 4 different orientations (opposite, face-to-face, and two side-to-side orientations). In each run, the achieved passive self-interference suppression for each one of the MRA modes was calculated. A certain threshold X is set that represents a desired passive self-interference suppression amount. Then, the patterns that achieve passive suppression>X at any time in any environment are selected. In other words, the patterns that are capable of achieving passive suppression>X at least once are selected. Thus, any pattern that is not selected should have passive suppression less than X in all tested scenarios.

Figure 13:
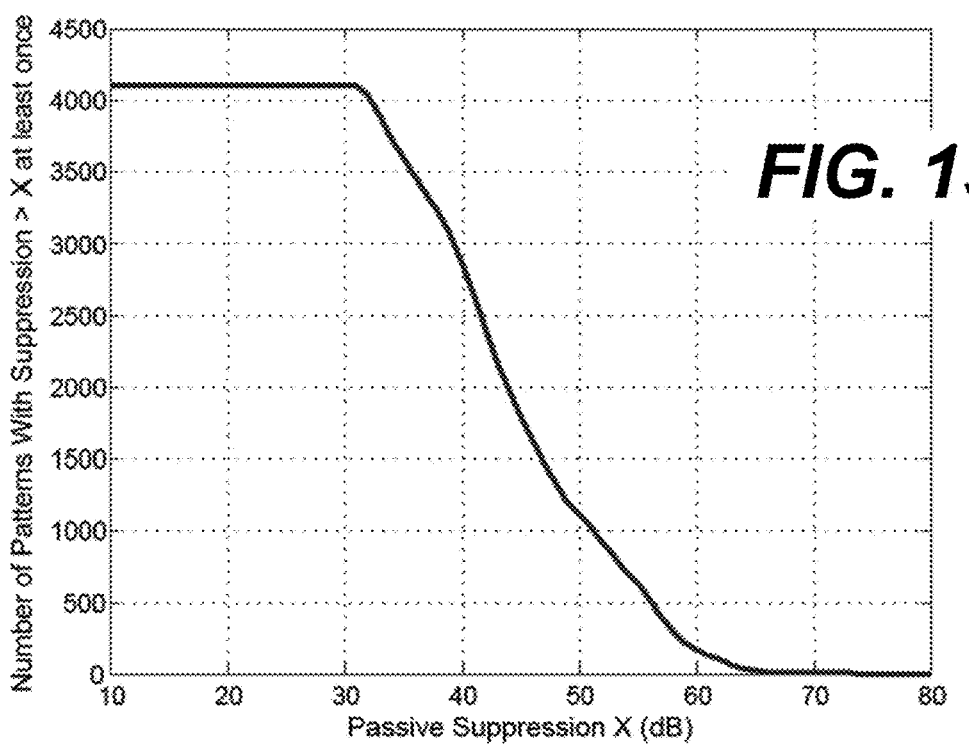
FIG. 13 illustrates the number of reconfigurable antenna patterns capable of achieving a certain amount of passive suppression in at least one tested scenario.

FIG. 13 illustrates the number of reconfigurable antenna patterns capable of achieving a certain amount of passive suppression in at least one tested scenario. The results in FIG. 13 show the number of patterns capable of achieving passive suppression>X at least once for different values of the threshold X. For instance, the results show that there are 1000 and 300 patterns capable of achieving passive suppression >52 dB and 58 dB, respectively.

Figure 14:
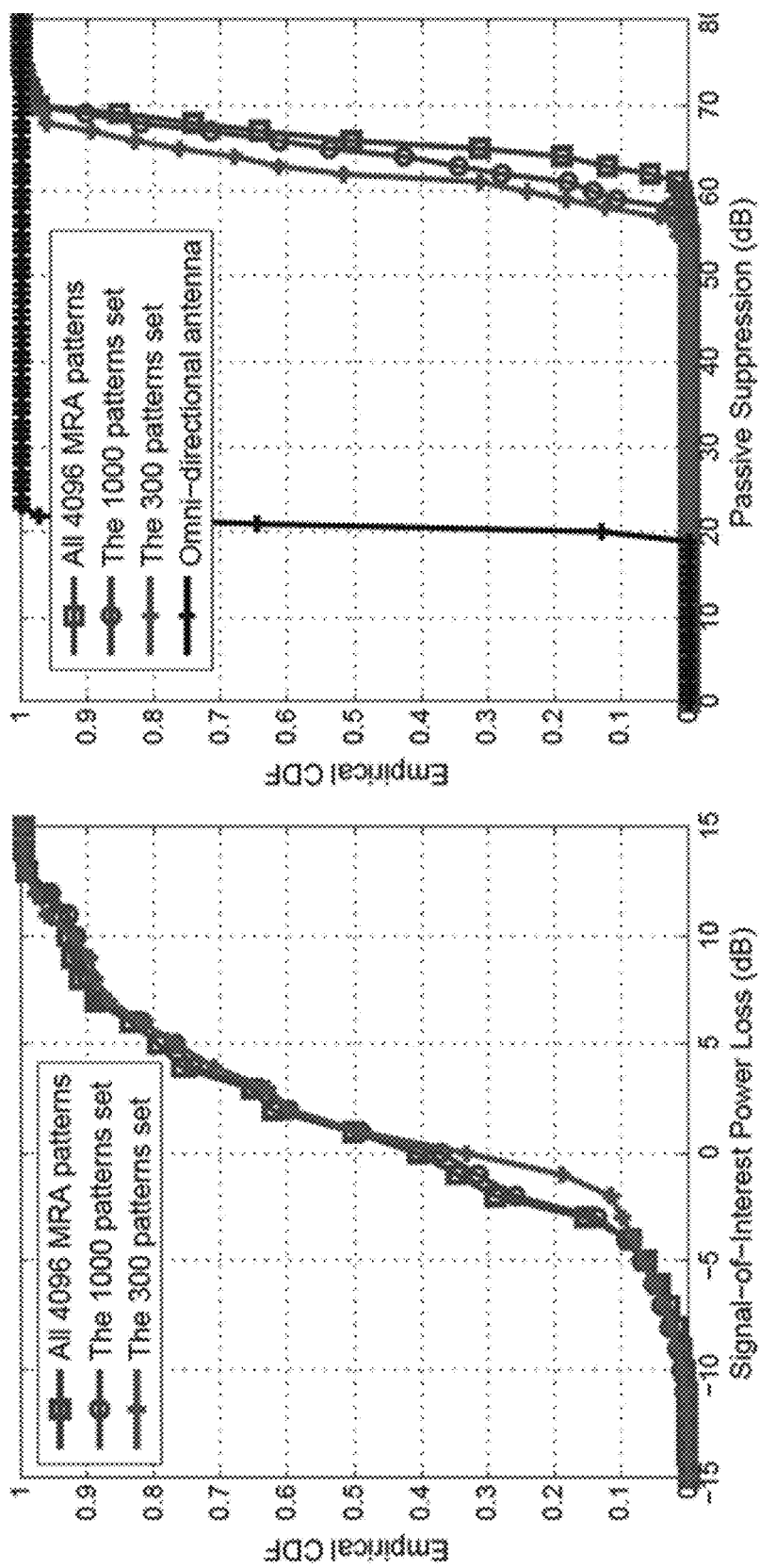
FIG. 14 illustrates passive self-interference suppression and signal-of-interest power loss CDFs for various subsets of MRA modes.

In order to test the accuracy of the proposed heuristic-based approach, two different suboptimal set of patterns were selected with passive suppression thresholds of X=52 dB and 58 dB, respectively. The first set contains 1000 patterns and the second set contains 300 patterns. The performance of the selected sets were characterized in more than 20 different experimental environments different from the 16 environments used to select the suboptimal sets. FIG. 14 illustrates passive self-interference suppression and signal-of-interest power loss CDFs for various subsets of MRA modes. The results show that the 300 pattern set achieves an average of about 62 dB passive self-interference suppression with about 3 dB loss compared to the optimal 4,096 pattern set, but at about 14 times less training time. Also, at about 4 times less training time, the 1000 pattern set achieves an average of about 64 dB passive self-interference suppression. On the other hand, from signal-of-interest perspective, the results show that the 1000 and 300 pattern sets achieve almost the same performance as the optimal 4,096 pattern set. It is noted that the experimental environments in this analysis are different from the environments used to select the suboptimal sets in the sense that the positions of the two communicating nodes are changed and different orientations spanning the 360 degrees are used.

Figure 15:
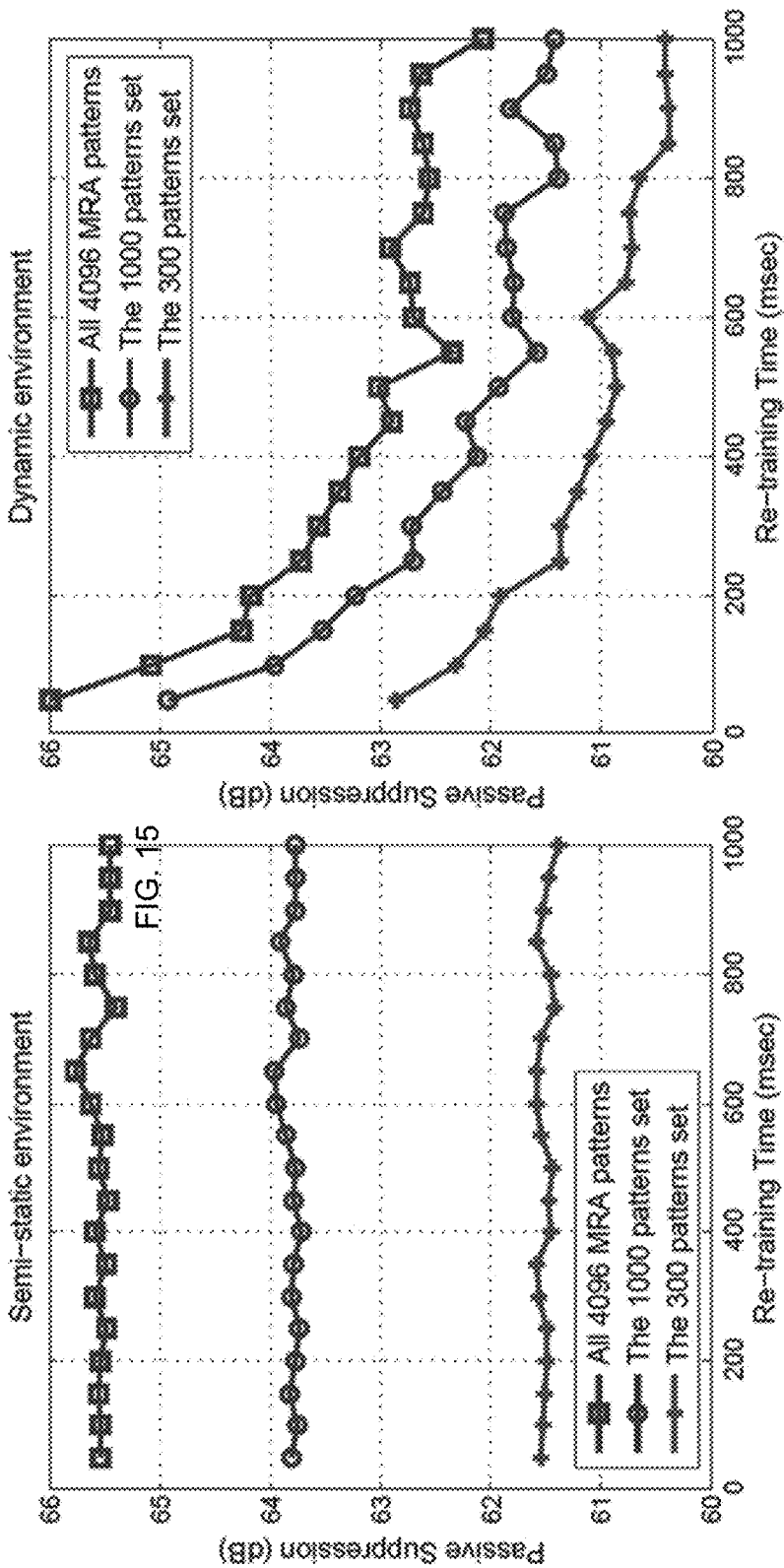
FIG. 15 illustrates an achieved average passive self-interference suppression at different re-training times for semi-static and dynamic environments.
Figure 16:
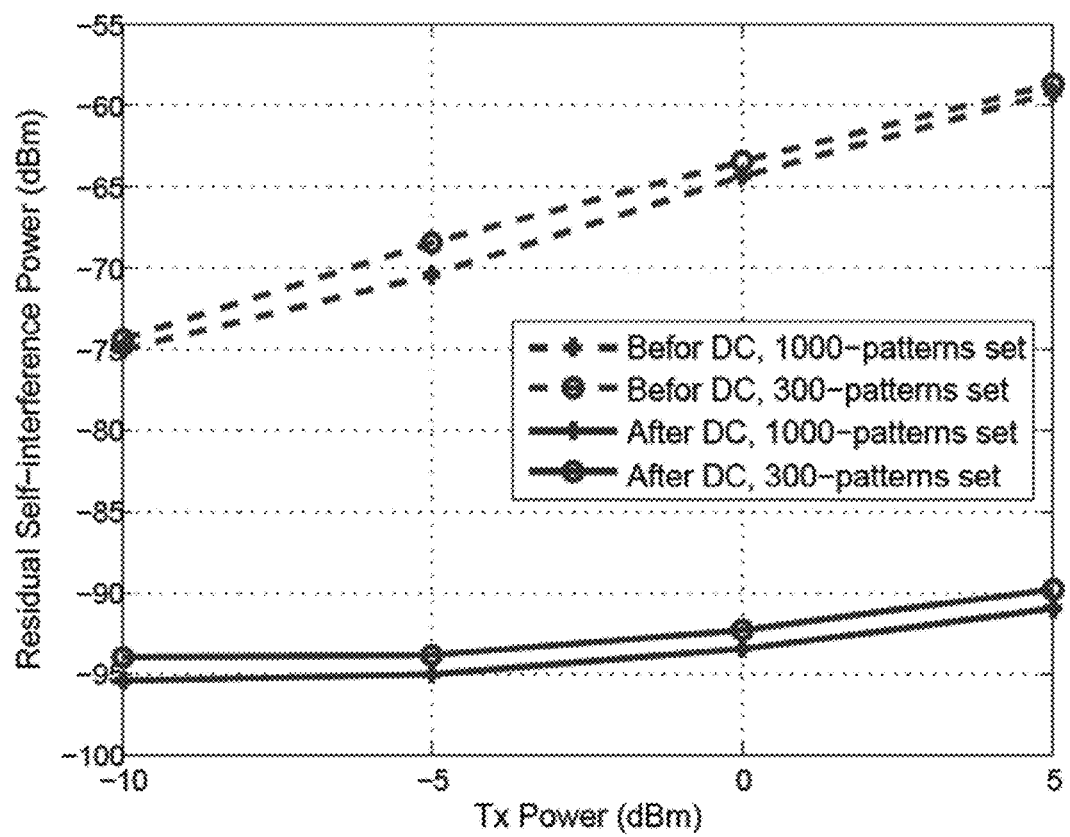
FIG. 16 illustrates residual self-interference power before and after digital cancellation at different transmit power values.

In this analysis, experiments are conducted in two main environments: semi-static and dynamic. FIG. 15 illustrates achieved average passive self-interference suppression at different re-training times for the semi-static and dynamic environments. The conclusions from these results are multifold. First, due to the slow channel variations in the semi-static environment, the system performance is almost constant with respect to the re-training time. In this type of environment, the MRA could be trained once per second with no performance loss. Assuming that each pattern requires 2 us training time, the training duration for the 4,096, 1000, and 300 pattern sets are about 8 ms, 2 ms, and 0.6 ms respectively. If the MRA is trained once per second, the training overhead for the 4,096, 1000, and 300 pattern sets will be 0.8%, 0.2%, and 0.06% respectively, which is a relatively negligible overhead compared to the expected capacity gain achieved by full-duplex systems.

Second, in the dynamic environment, due to the relatively fast channel variations, the system starts to lose performance with the increase of the re-training time. The results show that 2-3 dB passive self-interference suppression loss is expected when the re-training time increases from 50 ms to 500 ms. However, for fair comparison of the different pattern sets, the overall training overhead should be considered. Thus, rather than focusing on the re-training time, it is desired to observe performance at a fixed training overhead. For example, if the training overhead is fixed at 1% with a 2 us pattern training interval, the 4,096, 1000, and 300 pattern sets should be compared at re-training times of about 800 ms, 200 ms, and 60 ms, respectively. Comparing the performance of the different sets at the previous re-training times, we note that all different sets achieve approximately the same performance.

Another practical aspect that should be considered for re-training time is the useful data frame length. Although the performance of the optimum 4,096 pattern set is best, for reasonable training overhead, the required re-training time for the 4,096 pattern set is higher. For instance, from the previous examples, the optimal 4,096 pattern set at 1% training overhead, a re-training time of 800 ms is required regardless of the useful data length transmitted within the 800 ms. In other words, to guarantee a 1% training overhead, a useful data frame length of about 800 ms should be transmitted between the two successive MRA training intervals. Thus, in a multi-user networks, each user should be assigned a continuous 800 ms interval for data transmission, which is relatively large interval. On the other hand, the 300 pattern set requires only 60 ms re-training time. Accordingly, from a practical perspective, using smaller pattern sets alleviates the constraints on the overall network performance.

Below, the overall performance of a full-duplex system utilizing an MRA antenna is described. For full system performance characterization, MRA-based passive suppression is combined with the conventional digital self-interference cancellation techniques. In the full-duplex system, the received signal in the time and frequency domains can be written as:

$$y_n = h_n^I * (x_n^I + z_n^T) + h_n^S * (x_n^S + z_n^T) + z_n^R, \quad (1)$$

$$Y_k = H_k^I (X_k^I + Z_k^T) + H_k^S (X_k^S + Z_k^T) + Z_k^R, \quad (2)$$

where $x^I$, $x^S$ are the transmitted time domain self-interference and signal-of-interest signals, $h^I$, $h^S$ are the self-interference and signal-of-interest channels, $z^T$ represents the transmitter noise, $z^R$ represents the receiver noise, n is the time index, k is the subcarrier index, * denotes convolution process, and uppercase letters denote the frequency-domain representation of the corresponding time-domain signals. The digital cancellation is performed by subtracting the term $\hat{H}_k^I X_k^I$ from the received signal in (2). $\hat{H}^I$ is an estimate for the self-interference channel, obtained using training sequences transmitted at the beginning of each data frame.

The analysis below characterizes, the overall self-interference cancellation achieved using MRA-based passive suppression followed by digital cancellation. The complete system framework is used to characterize the overall self-interference cancellation performance. At the beginning, the MRA is trained and the optimum pattern is selected. Then, a sequence of data frames are transmitted from one node and the other node remains silent. In this case, the received data frame contains only the self-interference signal and the noise associated with it. The self-interference channel is estimated at the beginning of each data frame and the digital cancellation is performed. The total self-interference suppression is calculated as the ratio between the transmit power and the residual self-interference power after digital cancellation.

Figure 17:
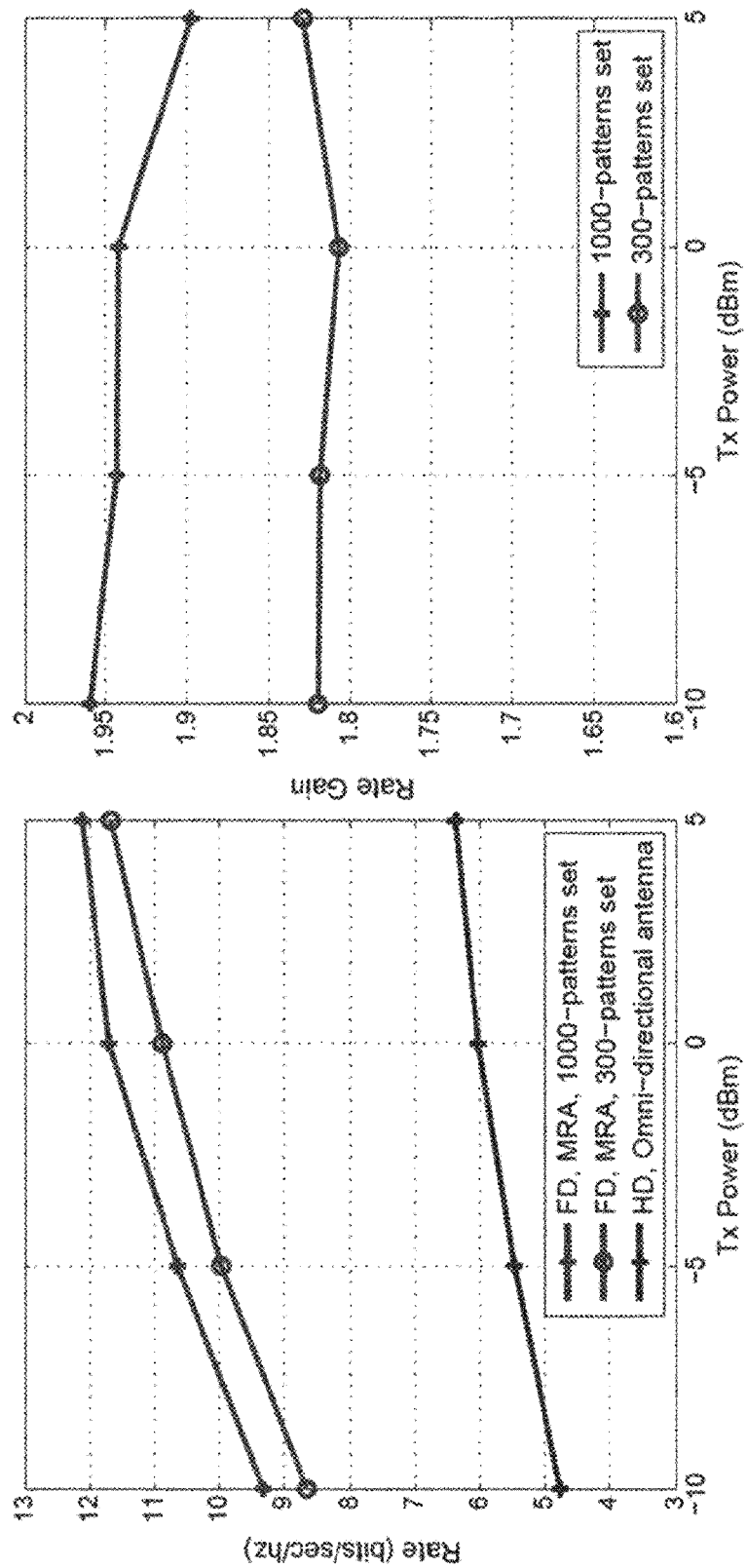
FIG. 17 illustrates achievable rate and rate gain for the full-duplex and half-duplex systems at different transmit power values.

FIG. 17 illustrates residual self-interference power before and after digital cancellation at different transmit power values. The results show that, in addition to the about 63 dB passive suppression, digital cancellation could achieve up to about 32 dB more self-interference cancellation for a total of about 95 dB self-interference cancellation. At high transmit power values, the 32 dB gain is mainly limited by the transmitter noise which cannot be eliminated using conventional digital cancellation techniques. On the other hand, at low transmit power values, the achieved digital cancellation amount is limited by the receiver noise floor. At lower transmit power levels, the self-interference signal is totally suppressed to below the receiver noise floor and the full-duplex systems is expected to achieve nearly 100% rate gain compared to half-duplex systems.

One important performance metric in full-duplex systems is the achievable rate gain compared to half-duplex systems. In this analysis, the achievable rate of the proposed full-duplex system is characterized in different experimental environments at different transmit power values. The performance is compared to the half-duplex system performance in the same environments. The achievable rate is calculated as a function of the effective Signal to Noise Ratio (SNR) as R−log 2 (1+SNR). One way to calculate the effective SNR in experimental analysis is by calculating the Error Vector Magnitude (EVM), defined as the distance between the received symbols (after equalization and digital cancellation) and the original transmitted symbols. Using an EVM to SNR conversion method, the SNR is calculated as $SNR = 1/(EVM)^2$.

The average achievable rate for both full-duplex and half-duplex systems is calculated as:

$$R^{FD} = \frac{1}{NMK} \sum_{n=1}^{N} \sum_{m=1}^{M} \sum_{k=1}^{K} \log_2[1 + SINR_{n,m,k}], \quad (3)$$

$$R^{HD} = \frac{1}{NMK} \sum_{n=1}^{N} \sum_{m=1}^{M} \sum_{k=1}^{K} \frac{1}{2} \log_2[1 + SNR_{n,m,k}], \quad (4)$$

where $R^{FD}$, $R^{HD}$ are the average achievable rate for full-duplex and half-duplex systems, SINR is the effective signal to interferer plus noise ratio in full-duplex system, SNR is the effective signal to noise ratio in half-duplex system, N, Al, and K are the total number of data frames, OFDM symbols per frame, and subcarriers per OFDM symbol, respectively. The factor of ½ in the half-duplex rate equation is due to the fact that each half-duplex node is transmitting only half of the time.

FIG. 17 illustrates achievable rate and rate gain for full-duplex and half-duplex systems at different transmit power values. The results show that the proposed full-duplex system achieves about 80-90% rate gain compared to the half-duplex system at about 5 dBm transmit power in typical indoor environments. The reason why the proposed full-duplex system could not achieve the 100% rate gain even at low transmits power values is due to the 1 dB signal-of-interest power loss shown in FIG. 15. This signal-of-interest power loss makes the full-duplex SINR less than the half-duplex SNR by about 1 dB even if the self-interference signal is totally suppressed below the noise floor. On the other hand, the performance difference between the 1000 and 300 pattern sets is due to the difference in the achieved self-interference cancellation amount as shown in FIG. 17.

Figure 18:
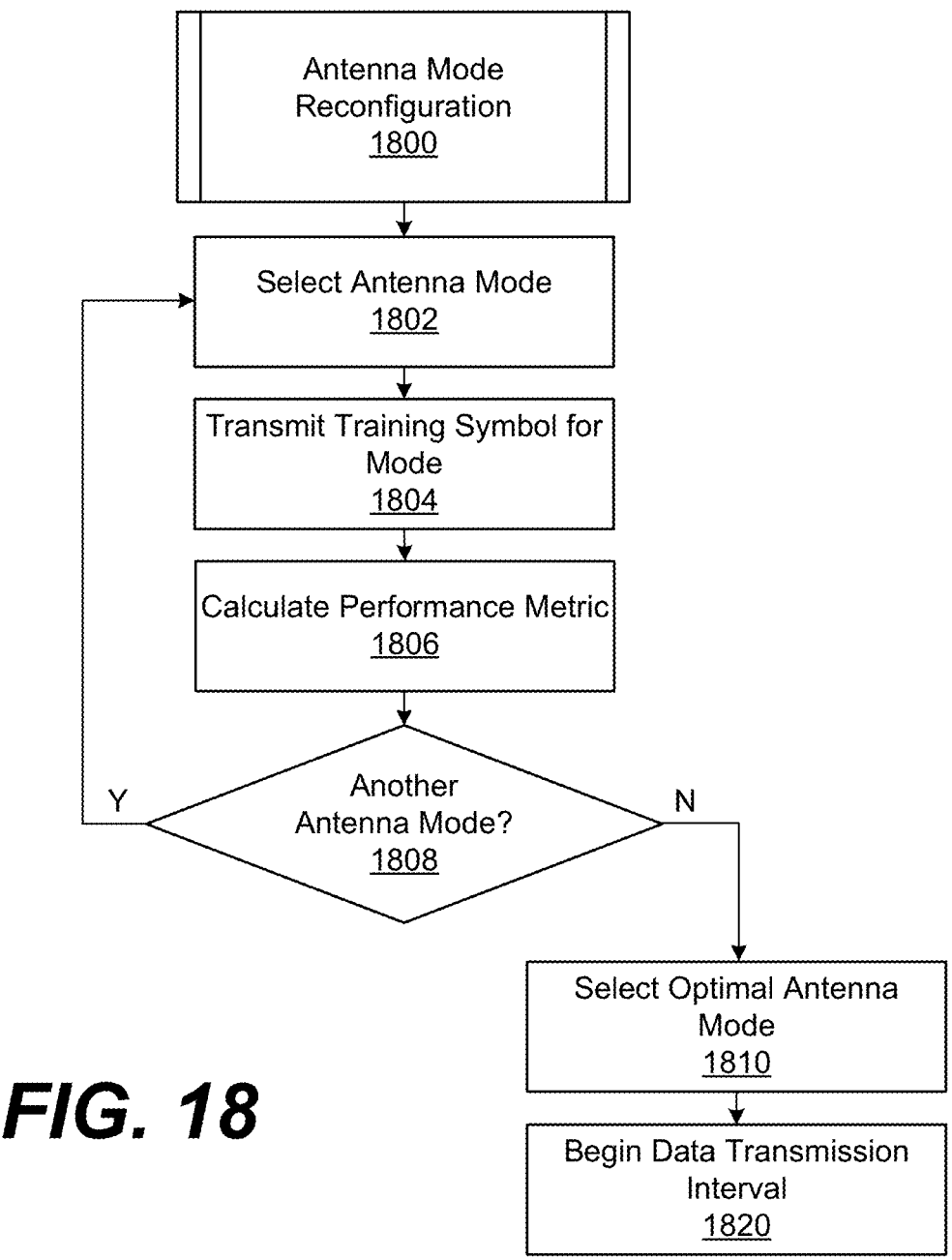
FIG. 18 illustrates a flow diagram for an antenna mode reconfiguration process performed by the reconfigurable receive antenna transceiver in FIG. 2 according to an example embodiment.

Before turning to the antenna mode reconfiguration process flow diagram of FIG. 18, it is noted that the process may be practiced using an alternative order of the steps illustrated in FIG. 18. That is, the process flow is provided as an example only, and the embodiments may be practiced using process flows that differ from that illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope and spirit of the embodiments. Finally, although the process 1800 in FIG. 18 is generally described in connection with the transceiver 200 in FIG. 2, the process 1800 may be performed by other transceivers (e.g., the transceivers 100, 300, 400, etc.).

FIG. 18 illustrates a flow diagram for an antenna mode reconfiguration process 1800 performed by the reconfigurable receive antenna transceiver 200 in FIG. 2 according to an example embodiment. At reference numeral 1802, the process 800 includes selecting, with the antenna controller 160 (FIG. 2), a mode of the reconfigurable antenna 150 of the transceiver 200. The reconfigurable antenna 150 may, in some embodiments, be similar to the MRA 600 in FIGS. 6A and 6B. In other words, at reference numeral 1802, the antenna controller 160 may electrically bias one or more of the PIN diodes in the MRA 600, as described above with reference to FIGS. 6A and 6B, for example.

At reference numeral 1804, the process 1800 includes transmitting, with the transmit chain 120 of the transceiver 200, a training symbol during part of a training interval. The training symbol may be similar to one of the L training symbols described above with reference to FIG. 5. At reference numeral 1806, the process 1800 includes calculating, with the antenna controller 160, a performance metric associated with the training symbol transmitted at reference numeral 1804. Here, it is noted that a portion of the training symbol transmitted at reference numeral 1804 may be received as self-interference over the MRA 600. Thus, at reference numeral 1806, a performance metric associated with the received self-interference may be calculated based on a threshold performance criteria of the transceiver 200. Any of the performance metrics or criteria described herein, such as SIR, may be calculated by the antenna controller 160 at reference numeral 1806, depending upon various design considerations.

At reference numeral 1808, the transceiver 200 determines whether another mode of the MRA 600 is available for consideration. With reference to the MRA 600 in FIG. 6A or 6B, for example, a total of 4,096 dynamically configurable radiation patterns or modes are available. Thus, the process 1800 may cycle through all 4,096 radiation patterns of the MRA 600, to determine an optimal pattern. Alternatively, a suboptimal set of patterns that are expected to achieve the best performance may be cycled, as described above, to reduce training time. In either case, if another mode of the MRA 600 is available for consideration, the process proceeds back to reference numeral 1802 for the selection of another mode of the MRA 600 and the transmission of another training symbol at reference numeral 1804.

If another mode of the MRA 600 is available for consideration, the process 1800 proceeds from reference numeral 1808 to 1810. At reference numeral 1810, the process 1800 includes selecting, with the antenna controller 160, a mode of the MRA 600 for use during a data transmission interval. The mode may be selected based on the performance metrics of the training symbols calculated at reference numeral 1806. Finally, at reference numeral 1820, the process 1800 includes beginning a data transmission interval for the transceiver 200 using the antenna mode selected at reference numeral 1810.

Figure 19:
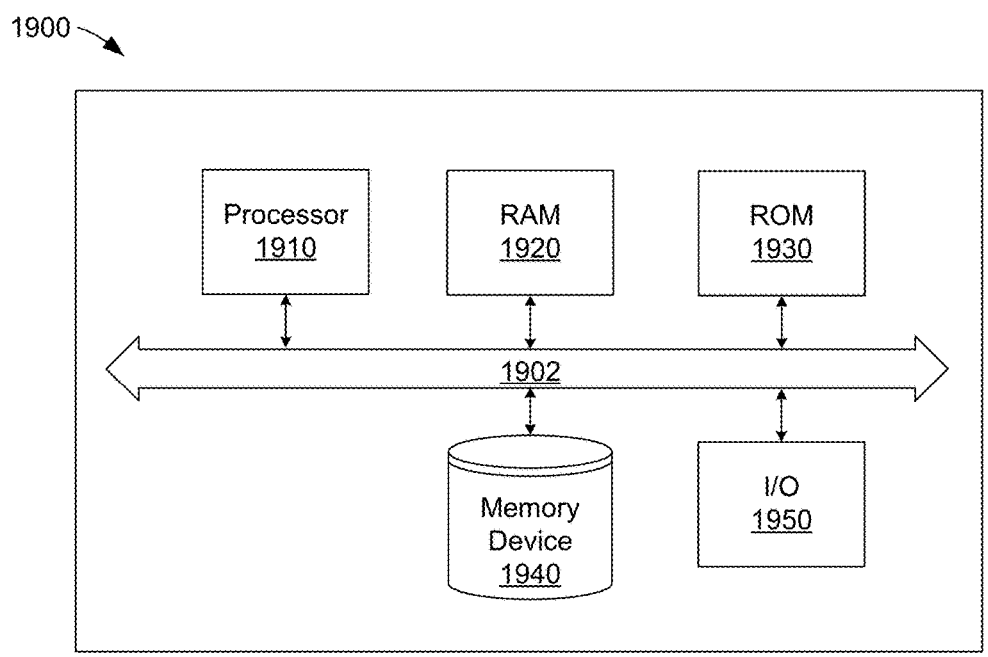
FIG. 19 illustrates an example schematic block diagram of a processing environment which may be relied upon, in part, in one or more of the transceivers in FIGS. 1-4, according to various embodiments described herein.

FIG. 19 illustrates an example schematic block diagram of a processing environment 1900 which may be relied upon, in part, in one or more of the transceivers 100, 200, 300, or 400 in FIGS. 1-4, according to various embodiments described herein. For example, the processing environment 1900 may form part of the digital signal processor 110, the transmit chain 120, and/or the receive chain 140 in one or more of the transceivers 100, 200, 300, or 400 in FIGS. 1-4. The processing environment 1900 may be embodied, in part, using one or more elements of a mixed general and/or specific purpose computer. The processing environment 1900 includes a processor 1910, a Random Access Memory (RAM) 1920, a Read Only Memory (ROM) 1930, a memory device 1940, and an Input Output (I/O) interface 1950. The elements of processing environment 1900 are communicatively coupled via one or more local interfaces 1902. The elements of the processing environment 1900 are not intended to be limiting in nature, as the architecture may omit elements or include additional or alternative elements.

In various embodiments, the processor 1910 may be embodied as one or more circuits, general purpose processors, state machines, ASICs, or any combination thereof. In certain aspects and embodiments, the processor 1910 is configured to execute one or more software modules which may be stored, for example, on the memory device 1940. The software modules may configure the processor 1910 to perform the tasks undertaken by one or more of the transceivers 100, 200, 300, or 400 in FIGS. 1-4. In certain embodiments, the process 1800 described in connection with FIG. 18 may be implemented or executed by the processor 1910 according to instructions stored on the memory device 1940.

The RAM and ROM 1920 and 1930 may include or be embodied as any random access and read only memory devices that store computer-readable instructions to be executed by the processor 1910. The memory device 1940 stores computer-readable instructions thereon that, when executed by the processor 1910, direct the processor 1910 to execute various aspects of the embodiments described herein.

As a non-limiting example group, the memory device 1940 includes one or more non-transitory memory devices, such as an optical disc, a magnetic disc, a semiconductor memory (i.e., a semiconductor, floating gate, or similar flash based memory), a magnetic tape memory, a removable memory, combinations thereof, or any other known non-transitory memory device or means for storing computer-readable instructions. The I/O interface 1950 includes device input and output interfaces, such as keyboard, pointing device, display, communication, and/or other interfaces. The one or more local interfaces 1902 electrically and communicatively couples the processor 1910, the RAM 1920, the ROM 1930, the memory device 1940, and the I/O interface 1950, so that data and instructions may be communicated among them.

In certain aspects, the processor 1910 is configured to retrieve computer-readable instructions and data stored on the memory device 1940, the RAM 1920, the ROM 1930, and/or other storage means, and copy the computer-readable instructions to the RAM 1920 or the ROM 1930 for execution, for example. The processor 1910 is further configured to execute the computer-readable instructions to implement various aspects and features of the embodiments described herein. For example, the processor 1910 may be adapted or configured to execute the process 1800 described above in connection with FIG. 18. In embodiments where the processor 1910 includes a state machine or ASIC, the processor 1910 may include internal memory and registers for maintenance of data being processed.

A full-duplex system utilizing one or more MRAs is described herein. The described MRA is a reconfigurable antenna capable of dynamically changing its properties according to certain input configurations. The performance of the MRA system is experimentally investigated in different indoor environments. The results show that a total of about 95 dB self-interference cancellation may be achieved by combining the MRA-based passive suppression technique with conventional digital self-interference cancellation techniques. In addition, the full-duplex achievable rate is experimentally investigated in typical indoor environments showing that the proposed full-duplex system achieves up to about 90% rate improvement compared to half-duplex systems in typical indoor environments.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

At least the following is claimed:

1. A transceiver, comprising:
   a transmit chain configured to transmit over a first antenna;
   a receive chain configured to receive over a second antenna, wherein at least one of the first antenna and the second antenna comprises a reconfigurable antenna having plurality of reconfigurable antenna modes;
   a digital signal processor configured to transmit a set of training symbols over the first antenna during a training interval; and
   an antenna controller configured to:
   to select a respective mode of the reconfigurable antenna for individual training symbols in the set of training symbols during the training interval; and
   set a mode of the reconfigurable antenna after the training interval.

2. The transceiver of claim 1, wherein the antenna controller is further configured to select the mode of the reconfigurable antenna based on a threshold performance metric of the transceiver during a data transmission interval.

3. The transceiver of claim 1, wherein a number of the set of training symbols is equal to a number of the plurality of reconfigurable antenna modes of the reconfigurable antenna.

4. The transceiver of claim 1, wherein a number of the set of training symbols is less than a number of the plurality of reconfigurable antenna modes of the reconfigurable antenna and is selected to achieve at least a threshold level of passive suppression.

5. The transceiver of claim 1, wherein the antenna controller is further configured to calculate a performance metric associated with one of the plurality of reconfigurable antenna modes of the reconfigurable antenna for each training symbol in the set of training symbols.

6. The transceiver of claim 5, wherein, after the training interval, the antenna controller is further configured to select a mode of the reconfigurable antenna that maximizes or minimizes the performance metric.

7. The transceiver of claim 1, wherein:
   the first antenna comprises a first reconfigurable antenna having a first plurality of reconfigurable antenna modes; and
   the second antenna comprises a second reconfigurable antenna having a second plurality of reconfigurable antenna modes.

8. The transceiver of claim 7, wherein the antenna controller is further configured to select a respective mode of the first reconfigurable antenna and select a respective mode of the second reconfigurable antenna for individual training symbols in the set of training symbols during the training interval.

9. The transceiver of claim 1, wherein the transmit chain is configured to transmit and the receive chain is configured to receive over a same carrier frequency simultaneously.

10. A method of reconfiguring a transceiver, comprising:
    transmitting, with a transmit chain of the transceiver, a set of training symbols during a training interval;
    selecting, with an antenna controller, a respective mode of a reconfigurable antenna of the transceiver for individual training symbols in the set of training symbols, the reconfigurable antenna having a plurality of reconfigurable antenna modes;
    calculating, with the antenna controller, a performance metric associated with one of the plurality of reconfigurable antenna modes of the reconfigurable antenna for each of the set of training symbols; and
    based on the performance metric, selecting, with the antenna controller, a mode of the reconfigurable antenna for use during a data transmission interval.

11. The method of claim 10, further comprising selecting the mode of the reconfigurable antenna for use during the data transmission interval based further upon a threshold received Signal-of-Interest to Interferer Ratio (SIR) of the transceiver.

12. The method of claim 10, wherein a number of the set of training symbols is equal to a number of the plurality of reconfigurable antenna modes of the reconfigurable antenna.

13. The method of claim 10, wherein a number of the set of training symbols is less than a number of the plurality of reconfigurable antenna modes of the reconfigurable antenna and is selected to achieve at least a threshold level of passive suppression.

14. The method of claim 10, further comprising:
    receiving, with a receive chain of the transceiver, the set of training symbols during the training interval;
    selecting, with the antenna controller, a respective mode of a second reconfigurable antenna of the transceiver for individual training symbols in the set of training symbols.

15. A transceiver, comprising:
    a digital signal processor configured to transmit a set of training symbols during a training interval;
    a transmit chain configured to transmit the set of training symbols over a reconfigurable antenna, the reconfigurable antenna having a plurality of reconfigurable antenna modes;
    a receive chain configured to receive at least one of the set of training symbols as self-interference; and
    an antenna controller configured to:
    select a respective mode of the reconfigurable antenna for individual training symbols in the set of training symbols during the training interval to calculate a performance metric; and
    set a mode of the reconfigurable antenna to reduce the self-interference based on the performance metric during a data transmission interval.

16. The transceiver of claim 15, wherein a number of the set of training symbols is less than a number of the plurality of reconfigurable antenna modes of the reconfigurable antenna and is selected to achieve at least a threshold level of passive suppression.

17. The transceiver of claim 15, wherein the antenna controller is further configured to calculate a performance metric associated with one of the plurality of reconfigurable antenna modes of the reconfigurable antenna for each training symbol in the set of training symbols.

18. The transceiver of claim 15, wherein, after the training interval, the antenna controller is further configured to select a mode of the reconfigurable antenna that maximizes or minimizes the performance metric.

19. The transceiver of claim 15, wherein the receive chain is configured to receive at least one of the set of training symbols over a second reconfigurable antenna, the second reconfigurable antenna having a second plurality of reconfigurable antenna modes.

20. The transceiver of claim 19, wherein the antenna controller is further configured to select a respective mode of the reconfigurable antenna and select a respective mode of the second reconfigurable antenna for individual training symbols in the set of training symbols during the training interval.

* * * * *